(12) United States Patent
McHenry et al.

(10) Patent No.: US 8,731,474 B2
(45) Date of Patent: May 20, 2014

(54) METHOD AND SYSTEM FOR MAN-MADE NOISE REJECTION DETECTOR

(75) Inventors: Mark Allen McHenry, McLean, VA (US); Karl Steadman, Arlington, VA (US); Tugba Erpek, Fairfax, VA (US); Ajitha Painumkal, Broadlands, VA (US)

(73) Assignee: Shared Spectrum Company, Vienna, VA (US)

( * ) Notice: Subject to any disclaimer, the term of this patent is extended or adjusted under 35 U.S.C. 154(b) by 9 days.

(21) Appl. No.: 13/481,278

(22) Filed: May 25, 2012

(65) Prior Publication Data

US 2012/0302190 A1    Nov. 29, 2012

Related U.S. Application Data

(60) Provisional application No. 61/489,942, filed on May 25, 2011.

(51) Int. Cl.
*H04B 15/00* (2006.01)
*H04W 72/00* (2009.01)

(52) U.S. Cl.
USPC .......................................... 455/62; 455/67.11

(58) Field of Classification Search
USPC .............................. 455/62, 63.1, 67.11, 67.13
See application file for complete search history.

(56) References Cited

U.S. PATENT DOCUMENTS

| | | | |
|---|---|---|---|
| 7,676,046 B1 | 3/2010 | Nelson et al. | |
| 7,684,467 B2 * | 3/2010 | Li et al. | 375/147 |
| 2002/0086641 A1 * | 7/2002 | Howard | 455/67.1 |
| 2007/0153878 A1 | 7/2007 | Filipovic | |
| 2008/0086286 A1 | 4/2008 | Shellhammer | |
| 2008/0112467 A1 | 5/2008 | Shellhammer | |
| 2010/0302459 A1 | 12/2010 | Zhang et al. | |
| 2011/0045781 A1 | 2/2011 | Shellhammer et al. | |

OTHER PUBLICATIONS

Allen, "A frequency domain Hampel filter for blind rejection of sinusoidal interference from electromyograms", Journal of Neuroscience Methods, vol. 177, No. 2, pp. 303-310, 2009.

* cited by examiner

*Primary Examiner* — Lee Nguyen
(74) *Attorney, Agent, or Firm* — Morris & Kamlay LLP

(57) ABSTRACT

Methods and systems for dynamic spectrum access (DSA) in a wireless network are provided. A DSA-enabled device may sense spectrum use in a region and, based on the detected spectrum use, select one or more communication channels for use. The devices also may detect one or more other DSA-enabled devices with which they can form DSA networks. A DSA network may monitor spectrum use by cooperative and non-cooperative devices, to dynamically select one or more channels to use for communication while avoiding or reducing interference with other devices. A man-made noise rejection sub-system is used to permit signal detection while maintaining a low false alarm rate.

12 Claims, 27 Drawing Sheets

Loc 1: NC BW 25 kHz

Multiple narrow band noise sources some with spikes of energy

Loc 1: NC BW 25 kHz

Loc 2: 61 in Ant Height, NC 100 BW kHz

Narrow band noise source

Loc 2: 61 in Ant Height, NC 100 BW kHz

Loc 3: 61 in Ant Height, Time 1, NC BW 100 kHz

Wide band noise source at bursts of time

Loc 3: 61 in Ant Height, Time 1, NC BW 100 kHz

Loc 4: 61 in Ant Height, NC BW 100 kHz

Man-made noise free

Loc 4: 61 in Ant Height, NC BW 100 kHz

METHOD AND SYSTEM FOR MAN-MADE NOISE REJECTION DETECTOR

CROSS-REFERENCE TO RELATED APPLICATIONS

This application claims the benefit of U.S. Provisional Application Ser. No. 61/489,942, filed May 25, 2011, the disclosure of which is incorporated by reference in its entirety.

COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2011, 2012, Shared Spectrum Company.

BACKGROUND OF THE INVENTION 1.1 Field of the Invention

The exemplary, illustrative, technology herein relates to systems, software, and methods for detecting and excising radio-frequency noise, such as the spur and impulse types characteristic of man-made radio-frequency noise, within desired spectrum ranges and configuring dynamic spectrum access-enabled (DSA-enabled) systems to make efficient use of available spectrum despite this radio frequency noise. These techniques permit a DSA system to identify additional available spectrum that would otherwise be excluded from use with current detectors.

The technology herein has applications in the areas of mobile radio communications, dynamic spectrum re-use, and improved efficiency in the use of available radio spectrum. This invention is also applicable to other signal detection areas such as SIGINT.

1.2 The Related Art

Cellular phones, personal digital assistants, walkie-talkies, garage door openers, television remote controls, baby monitors, computers, wireless routers and other devices can all incorporate radio technology to establish and maintain communications using the electromagnetic frequency spectrum (hereinafter referred to simply as "spectrum"). Due to the limited nature of spectrum, and the number of potential and actual uses for it, regulatory agencies have been empowered to determine allocations of spectrum for various uses and/or users. This is typically done by allocating a range of frequencies, or a "band", to a given use and/or users, and prohibiting interference in that band from other uses or users. Frequency bands may be further subdivided into channels, each of which represents a range of frequencies that may be used.

Some radio frequency (RF) devices, such as cordless telephones, can automatically choose a channel from among those channels assigned for use by the device in order to establish and maintain communications and then cease use of the channel when the radio session is finished. They may do this to avoid use of channels currently in use by other devices, or they may randomly choose channels from their available set of frequencies as a very limited form of security. However, such devices are unable to automatically adapt to significant or challenging changes within the network or spectrum environment. They simply select a channel from a limited set of predefined channels within an allocated band. Networked radios and other devices designed to operate within one particular channel, or set of channels, cannot operate outside of the designated channels without appropriate authorization from regulatory authorities or spectrum owners and/or modification of the radios. For example, a radio may search a specified band to find an open channel for communications with the network. The radio will sequentially or randomly step or hop through the band until an open channel is found or an indication is given (e.g., through a control signal) that the network is busy (e.g., no channels are available). Such a radio, however, does not determine a new band or frequency range from which to search for channels if a channel is not found. Rather, the radio either works within its prescribed frequency band according to its fixed characteristics (such as transmit power, bandwidth, and modulation scheme).

If a typical radio confronts interference from other devices or natural effects, such as power line arcing or lightning, its communications signals may not be transmitted or received while the interference persists. A typical radio communication system, however, is not able to adjust its own operation to overcome, and typically cannot independently determine how to overcome, problems such as harmful interference that may prevent the functioning of the system, or degrade, obstruct, or repeatedly interrupt service.

Dynamic spectrum access-enabled (DSA-enabled) devices are useful for dealing with these problems. The portions of spectrum available for use and actually used by a DSA-enabled device or network can be defined by a combination of the spectrum selected by an operator of the device or network, the spectrum in which the DSA-enabled devices are capable of operating, and access limitations set by policy, regulatory, service provider, and other requirements. Through their ability to adjust spectrum use based on existing conditions and other factors, DSA-enabled devices can avoid interference by shifting communications to parts of the spectrum where interference is absent, or avoid the use of spectrum where the DSA-enabled device's operations would create interference for others.

Some DSA-enabled devices detect and classify signals based upon identified and pre-specified signal characteristics. Signal noise may interfere with signal detection and identification. For example, energy-based signal detectors may discern noise as non-cooperative device signals since their energy level passes a threshold level test and then disqualify the affected channels as "in-use", even when the channels are not actually used. When noise occurs frequently enough, even noise discrimination methods that include signal duration factors in their detection methods will identify available spectrum as in use due to the noise.

Furthermore, conventional noise elimination techniques typically use such methods such as averaging signal strengths. These can be ineffective for eliminating some classes of noise. The variance of certain types of noise energy can be large compared to noise floor energy and may be similar in strength to signal energy. Averaging signal strengths doesn't reduce this noise energy relative to signal energy. Methods for reducing the noise level relative to the signal level are needed in order to reduce "false positive" signal detections caused by noise.

In urban environments, where man-made noise-creating devices are typically present in large numbers and at high densities, man-made noise may be present in such quantity as to make DSA channel selection difficult or even impossible. For example, experiments in New York City showed that many channels were affected by man-made noise ("Evaluation of the Performance of Prototype TV-Band White Space Devices", FCC Report, ET Docket No. 04-186, 2008). Man-made noise is often produced at high power levels, which means that the man-made noise may have larger received amplitude than the non-cooperative device signals which the DSA system must avoid interfering with to comply with regulatory requirements or for other reasons. The high power man-made noise can cause DSA systems to unnecessarily abandon channels that are not actually being used by non-cooperative devices. This leads to inefficient spectrum use, and in some cases can prevent a DSA-enabled device from operating at all. What is needed is a way to ignore man-made noise in automated ways and to permit auto-configuration of DSA-enabled systems to use more channels that are not being used by non-cooperative devices. This would have the effect of making more spectrum available for use. Avoiding false non-cooperative signal detections ("false positives") caused by man-made noise involves new detection mechanisms and classification mechanisms that operate in both the time and frequency domains.

Some techniques involve collection of historical signal information and analysis of the collected signal data over time in an effort to determine noise patterns. These techniques may be less effective when the DSA-enabled radio is mobile, due to the often localized and transient nature of certain noise types, such as man-made noise. These techniques are also less effective when the occurrences of noise are infrequent, or do not possess a predictable pattern.

Reliable methods for detecting and classifying spur and impulse noise, and enabling DSA-enabled devices to make use of the spectrum in which these types of noise occur, without treating the affected channels as "in-use," are needed. DSA-enabled devices using such methods could be effective within urban environments where existing DSA-enabled devices may not be reliably usable. Impulse and spur noise detection methods provide an opportunity for making significant spectrum available for DSA-enabled device use that is currently being treated as unusable.

SUMMARY OF THE INVENTION

Spur and impulse detection and excision using the described methods provides improved performance of DSA-enabled devices. Generally, the techniques described involves sampling the energy detected by a DSA-enabled device over a brief period of time, identifying those portions of the sampled signal that correspond to man-made noise (or other noise having similar characteristics), and excising those portions of the signal that correspond to this noise in order to selectively improve the SNR of the resulting signal. In the described systems, the portion of the sampled energy discarded includes the noise portion of the sample. A challenge is how to detect those portions of the sample which correspond to noise without utilizing power and compute-expensive processes or unnecessarily affecting those portions of the sample which correspond to signal.

The noise excision process also recognizes that there are several types of noise. Furthermore, DSA-enabled devices, and mobile DSA-enabled devices in particular, operate in a variety of environments. The excision techniques used may vary over time based upon the operating environment(s) of the DSA-enabled devices. In particular, mobile DSA-enabled devices may change operating environments as the DSA-enabled device is moved.

The mechanisms described for excising man-made noise are flexible so they can operate in a variety of signal environments and are optimized for low power usage so they operate well in mobile and power-limited DSA-enabled devices.

In an embodiment, a first exemplary DSA-enabled device can include one or more spectrum sensing components, collectively comprising a first circuit and referred to herein as a "detector", that is configured to detect signal transmissions of other devices in one or more regions of the radio spectrum, a second component, collectively comprising a second circuit (herein known as a "classifier") is configured to receive data from the detector and to determine the type or types of signal present in a first region of the radio spectrum. More particularly, a DSA-enabled device may include detector and/or classifier circuits that are configured to detect the portions of signals that are consistent with noise, and may operate in such a manner that the detector and/or classifier are used during the operation of the DSA-enabled device to identify specific signal portions as noise and cause the DSA-enabled device to operate in such a way as to mitigate the effects of the noise portions of the signal on the operation of the DSA-enabled device.

In an embodiment, a first exemplary DSA-enabled device's detector component, or components, can include various radio frequency energy, or other sensing elements, such as a narrow-band detector, a wide-band detector, a television (TV) detector, a radar detector, a wireless microphone detector, a man-made noise detector, signal directionality detector, or other detectors as may be determined to be useful by those with skill in the art, and may further integrate the results of these detector components as part of the operation of the DSA-enabled device. In an alternate exemplary embodiment, aspects of these detectors, or any combination of these detectors, may instead be included within one or more additional circuits of the DSA-enabled device, e.g. the detectors may be integrated within other DSA-enabled device components, such as, by example, a classifier, channel manager, or communication coordinator component.

In an embodiment, a first exemplary DSA-enabled device may further include a third component, including at least a third circuit, (herein known as a channel manager) configured to identify at least one channel suitable for use by the first DSA-enabled device to communicate with a second DSA-enabled device based on data generated by the detector and the classifier and a fourth component, comprising at least a fourth circuit, (known herein as a communication coordinator) useful to initiate and maintain communication with the second DSA-enabled device, and a transceiver to communicate with the second DSA-enabled device.

Other components can be included, such as a scheduler to direct periodic, or aperiodic, scanning by the detector. As described previously, available radio frequency spectrum can be divided into "channels", each with a specified frequency range. Channels can be further categorized so as to group them into categories. Different categories of channels can be examined by the detector at different rates, using different methods, with different periodic scanning intervals and/or with specified detector types so as to minimize time required for detection and to maximize detection sensitivity for each category of channel.

A first exemplary DSA-enabled device that is in communication with a second exemplary DSA-enabled device can, in some embodiments, share detector data with the second DSA-enabled device, thus permitting the second DSA-enabled device to make use of detector data of the first DSA-enabled device for its own operation that it might otherwise have no ability to collect.

In an embodiment, a first DSA-enabled device can include one or more detectors to determine available spectrum on a first channel and on a second channel different from the first channel, a capability for coordination of dynamic spectrum use by the first device and at least one cooperative second device based on the spectrum availability determined by said first device's detector or detectors, and a transceiver for communicating with the at least one second cooperative device on the said second channel, where the detector can be configured to detect available spectrum on the first channel concurrently with said transceiver communicating with the at least one cooperative second device on the second channel. The first and second channels can be, for example, active and backup channels, respectively.

In an embodiment, a detector can determine spectrum availability of a first channel at a first rate, and of a second channel at a different second rate. A detector can determine spectrum availability on a first channel during a first time period during which the first DSA-enabled device and other cooperative DSA-enabled devices refrain from transmitting. A detector component can include a first detector circuit to determine spectrum availability within a first region of spectrum that includes the first channel and a second detector to determine spectrum availability within a second region of spectrum, which may overlap some, all, or none of the first region. The detector component also can determine spectrum availability on the second channel concurrently with the transceiver communicating with the second cooperative device on the second channel. The first DSA-enabled device also can include a signal classifier that is configured to classify a signal in the first channel as being sent by a second cooperative device or a by a third non-cooperative device.

DSA-enabled devices can be designed to avoid specific areas of spectrum that are currently in use by other "primary" devices. Typically, DSA-enabled devices have focused on identifying the maximum signal level present within a given channel and rejecting the channel for use by the DSA-enabled devices if the maximum signal level present in the channel is above a predefined threshold within a certain time period.

Certain types of signals, referred to herein as "man-made noise", are artifacts of our electronics-using society. They are created by everyday technologies, such as car engines, power line arcing, laptops, power supplies, etc. These types of signals can be classified as "impulse", where a plurality of channels are filled with a short duration burst of noise (see FIG. 1), or "spur" noise, where a narrow frequency band is filled with a longer duration noise event (see FIG. 3).

FIG. 1 is a graph of a typical impulse noise event. The graph shows detection of a relatively constant "noise floor" of background RF energy (typically caused by pre-amplifier noise) 1020 that is interrupted for a brief time by a burst of more powerful noise 1010 that occurs across a wide band of frequencies (typically hundreds of megahertz). Once the impulse event ends, the spectrum returns to its prior state; in this case to the noise floor with no other signals present during the time shown.

FIG. 2 is a graph of an exemplary periodic impulse scenario, such as might be caused by a gasoline engine spark plug that can produce regularly occurring impulse events. The graph shows a series of impulse events, such as 2020 through 2040, that each includes a brief occurrence of strong RF noise rising well above the noise floor 2010.

FIG. 3 shows an example of spur noise. The noise floor 3020 is relatively constant at most frequencies except at the spur frequency, during the exemplary spur noise event 3010. Such noise can be created by various causes, such as operation of some switching power supplies. Spur noise is characterized by interference only in a particular narrow frequency band and little or no energy elsewhere in the spectrum. Spur noise events are often repetitive and typically last much longer than impulse noise events. Some can be continuous.

The nature of both spurs and impulses is that they are localized, often affecting receivers only within a specific (usually short) distance from the noise source, and, in the case of spurs, often do not occupy an entire communication band, or even an entire channel.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification; illustrate embodiments of the invention and together with the detailed description serve to explain the principles of the invention. No attempt is made to show structural details of the invention in more detail than may be necessary for a fundamental understanding of the invention and various ways in which it may be practiced.

DETAILED DESCRIPTION OF THE INVENTION

1.3 Overview

Figure 1:
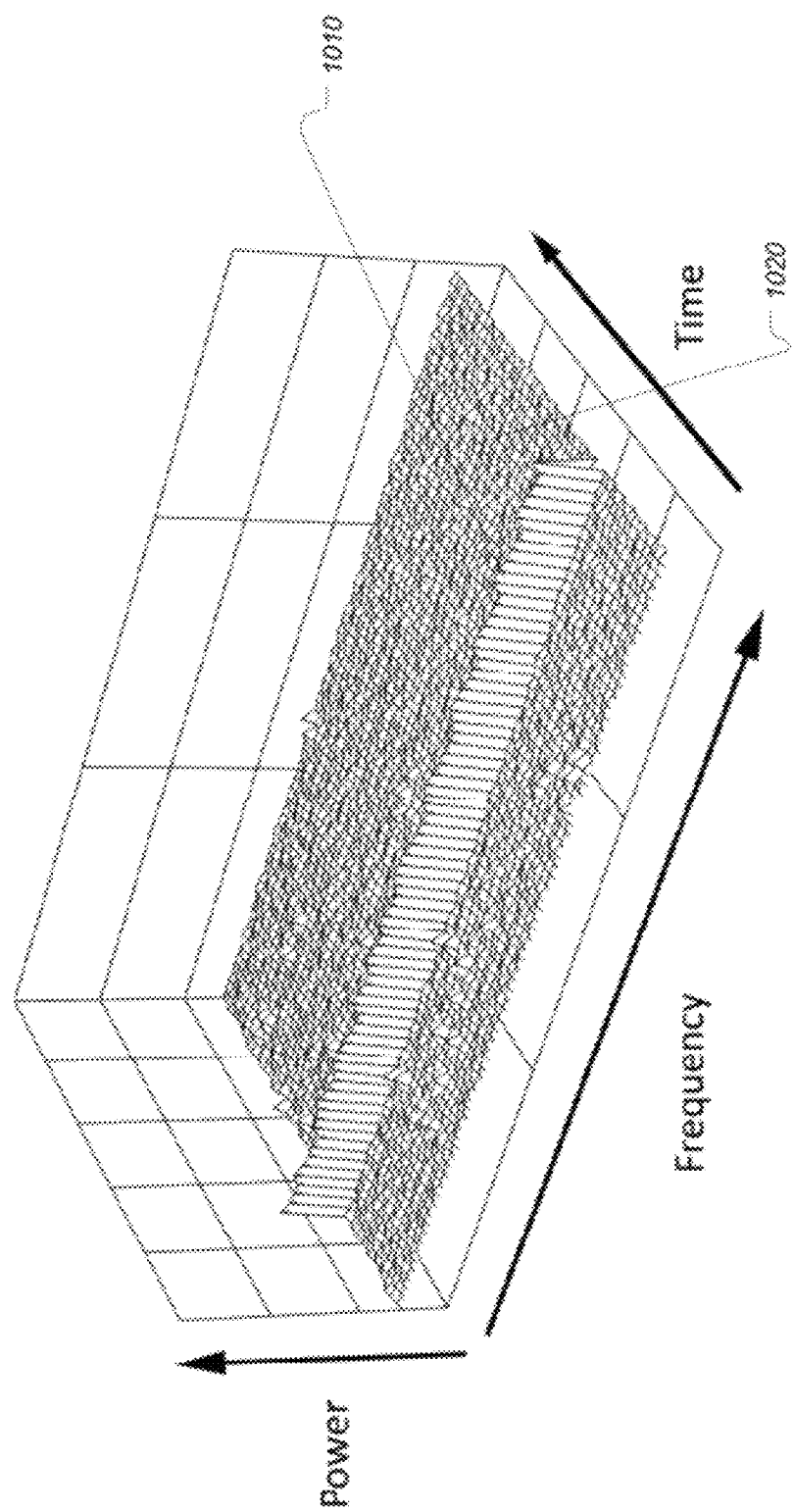
FIG. 1 is a graph depicting an example of impulse noise.
Figure 2:
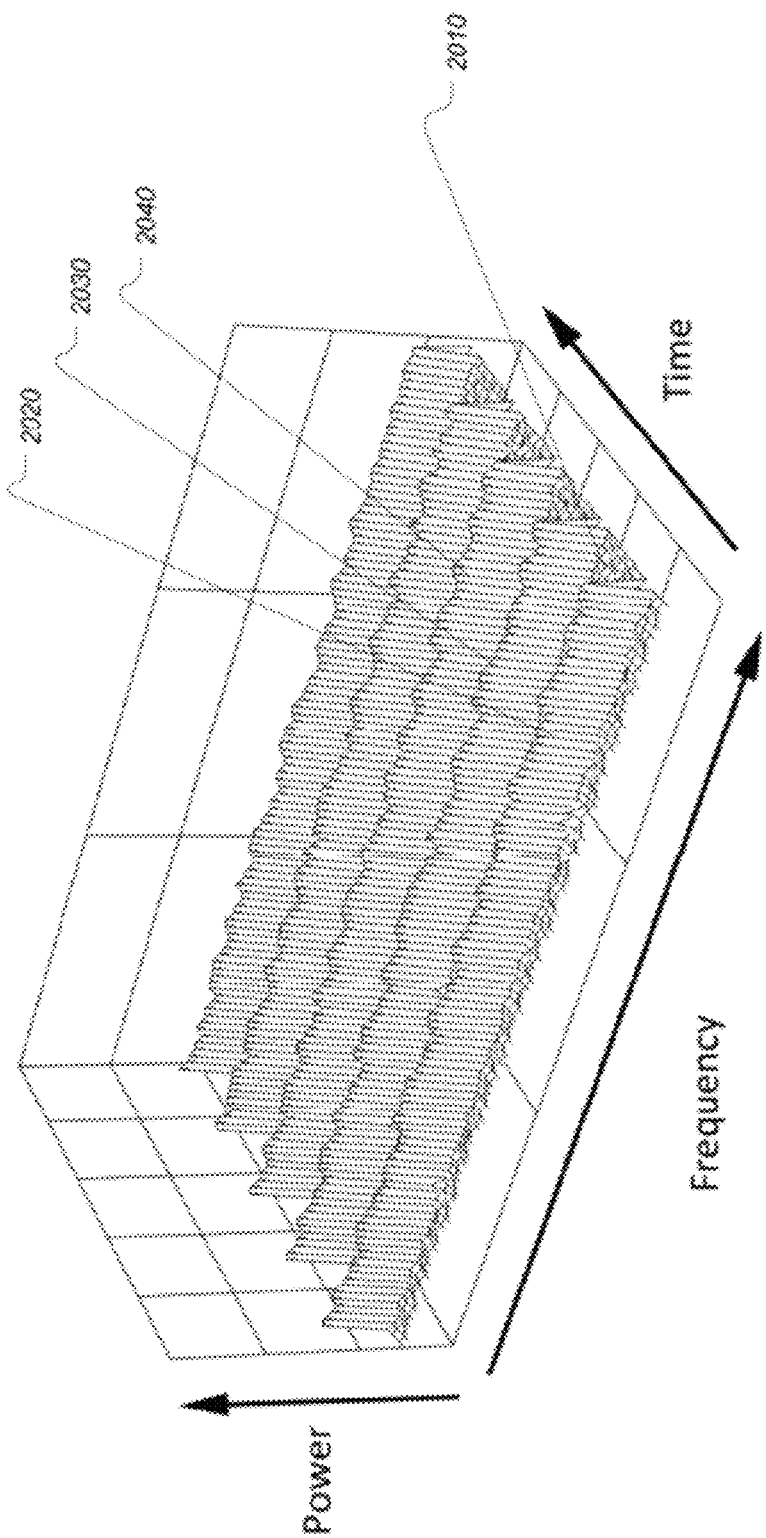
FIG. 2 is a graph depicting an example of regularly repeating impulse noise.
Figure 3:
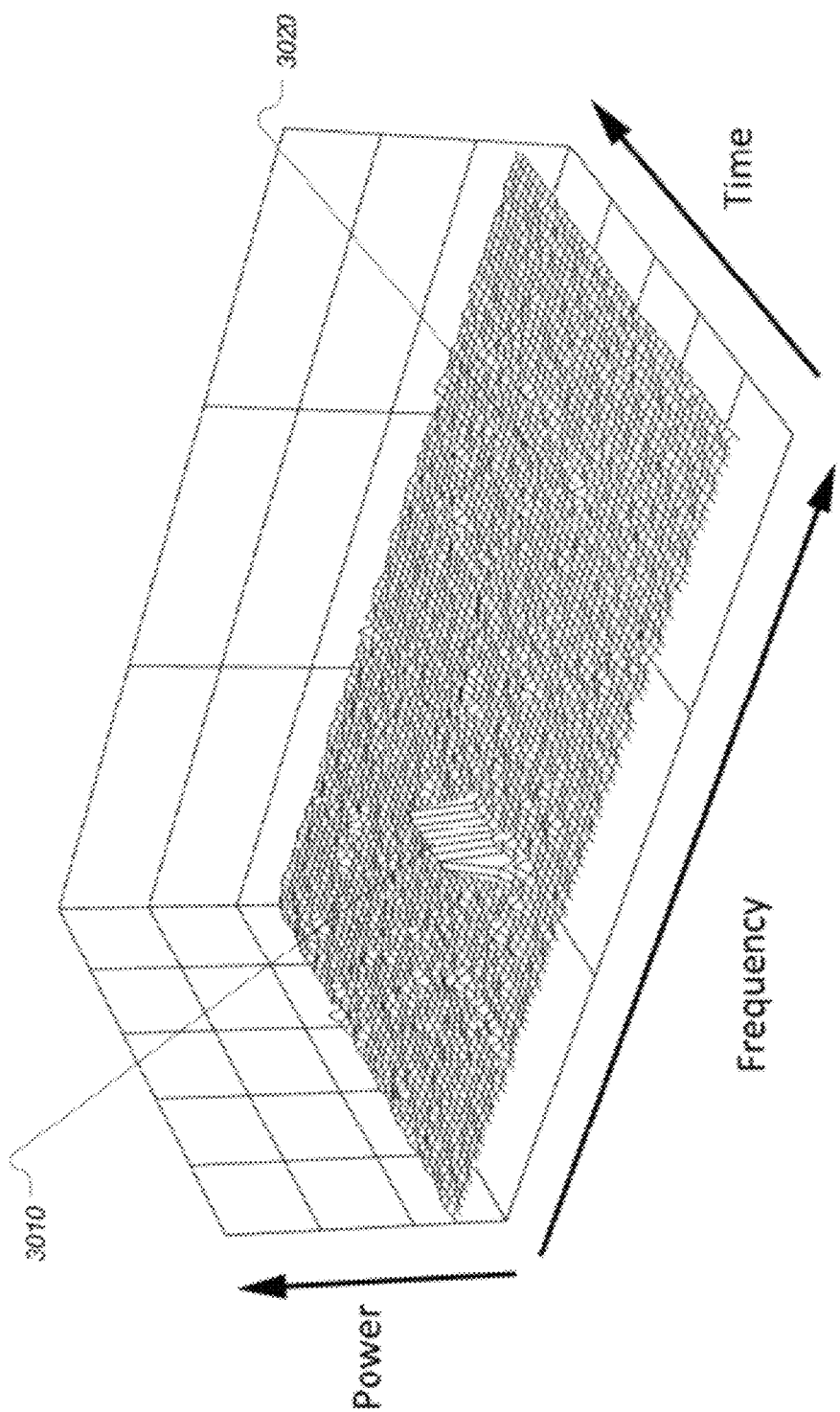
FIG. 3 is a graph depicting an example of spur noise.

It is understood that the invention is not limited to the particular methodology, protocols, topologies, etc., as described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise.

Unless defined otherwise, all technical and scientific terms used herein have the same meanings as commonly understood by one of ordinary skill in the art to which the invention pertains. The embodiments of the invention and the various features and advantageous details thereof are explained more fully with reference to the non-limiting embodiments and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein.

Particular methods, devices, and materials are described, although any methods and materials similar or equivalent to those described herein can be used in the practice or testing of the invention. All references referred to herein are incorporated by reference herein in their entirety.

Moreover, provided immediately below is a "Definition" section, where certain terms related to the invention are defined specifically. Where the provided definitions differ from meanings as commonly understood by one of ordinary skill in the art, the provided definition should take precedence herein.

These and other aspects and advantages will become apparent when the Description below is read in conjunction with the accompanying Drawings.

1.4 Definitions

The following definitions are used throughout, unless specifically indicated otherwise:

The term "channel" refers to a logical channel unless indicated otherwise, which may include one or more physical channels or frequencies. Typically, a logical channel can be mapped to a communication frequency or a set of communication frequencies used to communicate among devices that use the channel. A channel typically is defined as a range of frequencies (e.g. 900-910 MHz). "Channelization" refers to the definition of one or more channels within a defined spectrum range. A channel may be described as in use or occupied if at least one frequency in the channel is in use by a device, or if a signal is otherwise detected in at least one frequency in the channel. The term "center frequency" may be used to refer to a frequency at or near the center of a logical channel. Thus, a channel also may be specified in terms of a center frequency and channel width.

"Dynamic Spectrum Access" (DSA) refers to the process of communicating on one or more channels which may be selected subsequent to initialization of communication between two devices. Typically a DSA process may use regions of spectrum to which the devices do not have priority use rights, i.e., the devices may not be primary devices, or may not be providing a primary use of the region of spectrum. A Dynamic Spectrum Access-enabled ("DSA-enabled") device is a device that is capable of communicating with one or more other DSA-enabled devices using a dynamic spectrum access process. Typically, DSA-enabled devices can autonomously assess the radio spectrum environment, and may automatically select a communication channel based on capacity, interference, and/or other conditions. A DSA-enabled device also may be referred to as a DSA node. DSA-enabled devices typically operate within the radio frequency (RF) regions of the electromagnetic spectrum.

Two devices are described as "cooperative" devices if they engage in communication and channel switching among identified available channels. A device that is not engaging in communication with another device may be described as "non-cooperative" with the other device. Thus, two DSA networks may overlap in channel use without the members of each network being considered as "cooperative" with members of the other network. Non-cooperative devices typically do not exchange communication data, but may share or exchange control data, such as when non-cooperative DSA networks in a geographic region are configured to use a synchronized detection gap. A DSA signal or device may further be classified as cooperative or non-cooperative. A non-DSA-enabled device or signal may be described as non-DSA and/or non-cooperative. That is, a device may be incapable of performing, or not configured to perform, dynamic spectrum allocation, but also may be described as non-cooperative. Thus, in some contexts the term "non-cooperative" may encompass a non-DSA-enabled device. For example, a signal detected on a channel may be classified initially as DSA or non-DSA. An unclassified signal may be treated and described as a non-DSA signal unless and until it is classified otherwise. A "DSA signal" refers to a transmission sent by or identified as sent by a DSA-enabled device, whether cooperative or non-cooperative. A signal may be described as "cooperative" or "non-cooperative" based on whether it was sent by or identified as sent by a cooperative or non-cooperative DSA-enabled device, respectively. A "non-cooperative signal" also may refer to a signal from a non-DSA-enabled device.

The term "detector" refers to one or more sensors capable of sensing radio frequency electromagnetic energy at one or more frequencies and providing amplitude data related to the sensed energies to other components of a device, or to other devices. A detector typically includes a hardware sensor and may include additional software, hardware, or both useful to perform processing of the sensed energies. Unlike a receiver, a detector typically does not demodulate or otherwise extract transmitted information from sensed energy, such as information contained in a signal sent on a channel. A detector may calculate or infer information about the energy itself, such as the amplitude and/or frequency at which the energy is detected. A detector may also be referred to as an "environmental sensor" in the context of DSA-enabled devices herein.

The term "detection gap" or "gap" refers to a synchronized time period during which DSA-enabled devices in one or more DSA networks refrain from transmitting, which can enable more efficient or successful detection of non-cooperative device use of spectrum. The detection gap also may be referred to as a "quiet period." Typically, one or more devices in a DSA-enabled network may detect during this period.

The terms "module" and "circuit" refer to a device or device component that performs one or more logically-related functions. A module or circuit may include hardware, software, or both hardware and software, and may implement one or more logical processes.

A "DSA-enabled network" or "DSA network" refers to a network of DSA-enabled devices that operate cooperatively. A Dynamic Spectrum Access (DSA) network may use one or more DSA-enabled devices that can autonomously assess the radio spectrum environment; and may automatically (i.e., without human intervention) adjust communication channels used by the DSA-enabled devices based on various capacity, interference, and other conditions. A DSA-enabled device may use a portion of spectrum that is assigned for use by, or that may be in use by another system or network. The DSA-enabled device may seek to avoid or minimize interference with other wireless signals in a spectral region used by the DSA system or network.

The term "local" may refer to a module, device, component, circuit, or data that is integral to the functionality of an individual DSA-enabled device or other device, regardless of where the module, device, component, circuit or data is physically located, or how it is accessed by other parts of an individual DSA-enabled device. For example, each DSA-enabled device in a DSA-enabled network may include a local detector that is used by the device. Such a detector may be built into an enclosure with other components of the DSA-enabled device, may be connected externally to such enclosure by a plug, cable, IrDA link, or other means, or may be connected at some distance to the DSA-enabled device and connected by a cable, network link, radio link, laser data link, or other means. The term "local" does not imply distance between components, connection means, or physical incorporation of one component into another.

The term "bin" or "Fast Fourier Transform bin" refers to the frequency-related values resulting from application of the Fast Fourier Transform (FFT) to a received signal. An FFT converts a signal from the time domain (signal strength as a function of time) to the frequency domain (signal strength as a function of frequency) resulting in the signal being divided into a number of discrete values, or "bins", with each bin representing the signal strength at a given frequency.

The term "frequency domain median power value" refers to the median value of the FFT (Fast Fourier Transform) data over a range of bins. The median value is obtained from a calculation using the values of each FFT frequency bin in the range. The "frequency domain mean power value" refers to the mean value of the FFT (Fast Fourier Transform) data over a range of bins. The mean value is obtained from a calculation using the values of each FFT frequency bin in the range.

1.5 DSA-Enabled Devices

DSA-enabled devices as referred to herein are substantially as described in U.S. patent application Ser. No. 12/541,616, filed Aug. 14, 2009, the entirety of which is incorporated herein by reference. Where descriptions herein and those of patent application Ser. No. 12/541,616 conflict in describing any aspect, those herein take precedence for purposes of this disclosure.

Figure 4:
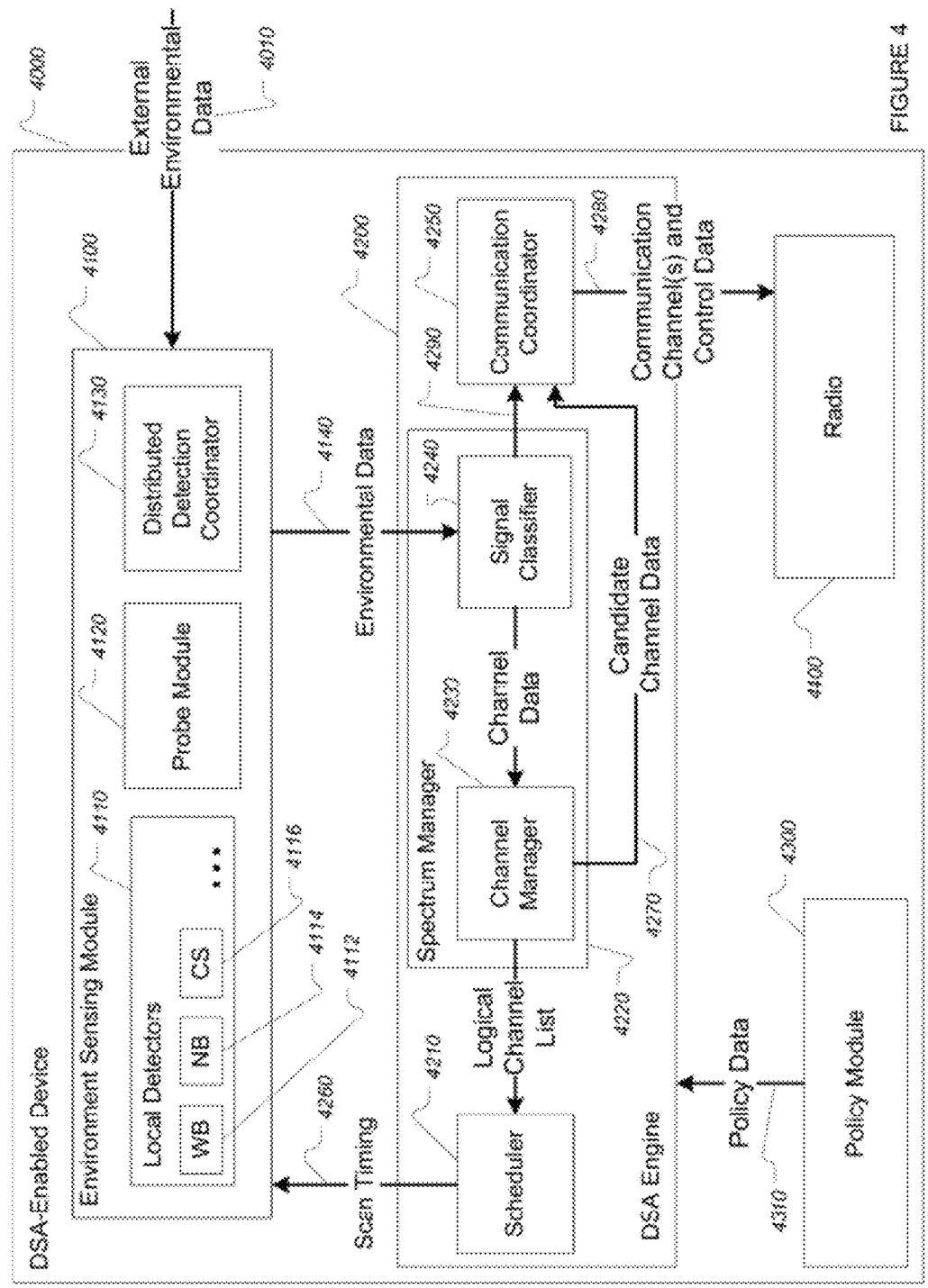
FIG. 4 shows a block diagram depicting elements of an example DSA-enabled device according to an embodiment of the invention.

FIG. 4 shows an exemplary DSA-enabled device according to some embodiments of the invention. In some embodiments, a DSA-enabled device 4000 can include four main components: one or more environment sensing and detection modules 4100 (e.g. one or more local detectors 4110); a DSA engine 4200; a radio or other communications module 4400, and a policy module 4300. The DSA-enabled device may have a single detector, one or more detectors that interoperate as a single detector, a plurality of detectors that operate separately, or any combination of these. Detectors can be integrated into the exemplary DSA-enabled device, or be separate from it.

The environmental sensing module 4100 may include a distributed detection coordinator 4130 to manage the distribution and receipt of distributed environmental sensing information 4140 among one or more DSA-enabled devices. The environmental sensing information 4140 may include, for example, an indication of radio frequency electromagnetic energy and/or signals detected by each DSA-enabled device in one or more channels. The distributed detection coordinator 4130 also may manage low-level security information between the DSA-enabled devices when these devices exchange sensor data.

The DSA engine module 4200 may include several components, such as a spectrum manager 4220; a communication coordinator 4250; and a high-level scheduler 4210. Within each DSA-enabled device, one or more modules, such as, for example, the scheduler 4210, may manage 4260 operation of the detectors 4100. A DSA-enabled device also may include a policy module 4300 to receive and store policy information that may be provided to other modules 4310 in the DSA-enabled device. A DSA-enabled device also may include one or more radios 4400, which may include one on more hardware transceivers or other communication devices (not shown).

In some embodiments, some DSA-enabled devices in a system or network include one or more local detectors, while other DSA-enabled devices do not include or use a local detector. In such an embodiment, the DSA-enabled devices which include detectors may provide spectrum usage information to the other DSA-enabled devices that do not have local detectors. External spectrum measurement systems also may be implemented. For example, one or more detectors that are not DSA-enabled devices or are not in a DSA-enabled network may gather and distribute spectrum information to the DSA-enabled devices, which may or may not include detectors.

Each local detector 4110 may further include circuits and computer software effective to monitor or sample a portion of spectrum, such as a range of frequencies defined by a set of logical channels, to determine whether the portion of spectrum is in use. One or more local detectors 4110 may be used to measure electromagnetic energy across channels. Various types of local detectors 4110 may be used, including wideband detectors 4112, narrowband detectors 4114, application-specific detectors such as detectors configured to specifically detect man-made noise, television, cellular, wireless microphone, or other specific signals 4116, and any other suitable detector. The environmental sensing module 4100 also may include a probe signal module 4120 to coordinate sending/receiving probe signals that are used to identify signal propagation characteristics between DSA-enabled devices in a DSA network. Each of these detector types may have noise-excision technology included within it. The environmental sensing module 4100 may provide environmental sensing information 4140 (also called detection data) to one or more modules of the DSA engine module 4200, including radio frequency (RF) environment information such as energy levels, specific signal types and strengths, power levels and structures of signals in a region of spectrum detected by the local detectors, environmental sensing information received from other cooperative devices, signal propagation data, and any other environmental data detectable by the DSA-enabled device. The environmental sensing module 4100 may receive control inputs 4260, such as scan timing, from the DSA engine module 4200 that specify when and upon which portions of the spectrum the local detectors 4110 are utilized, when the probe 4120 operates, and how cooperative sensing information is collected, reported, and secured.

DSA-enabled devices may include a capability to perform several functions: detection of non-cooperative, non-DSA signals, detection of other DSA-enabled devices or DSA-enabled networks, and detection and characterization of spur and/or impulse noise. By detecting non-cooperative, non-DSA signals, a DSA-enabled device can reduce or minimize the potential for interference with the associated non-DSA sources. Detection of other DSA-enabled devices can allow the DSA-enabled device to join one or more DSA-enabled networks, and/or to avoid simultaneous use of spectrum with other, non-cooperative DSA-enabled devices and thus reduce or minimize mutual interference. For example, again referring to FIG. 4, the environmental sensing module 4100 can provide data used to determine the maximum transmitting power the DSA-enabled device can or should use so as to limit harmful interference with other users of the spectrum to a specific level, or to minimize or eliminate such interference. The detector information also may be used by the spectrum manager 4220 and/or communication coordinator 4250 to identify and classify other DSA signals. A higher sensitivity in detection can enable more accurate identification and classification of sensed signals, can enable the DSA-enabled device to transmit at higher power levels without causing interference, and can enable a DSA-enabled device to find other DSA-enabled devices at greater distances or in more problematic signal environments.

A DSA-enabled device typically may perform environmental sensing, including detection of other signals, at a separate time from when it performs routine transmission and reception of data and control information. This can allow the automatic gain control (AGC) and/or other receiver parameters to be optimized for detection independently from parameters used for data reception. In some configurations, sensing may take place during the reception of data if there are two simultaneous data paths to the radio or other transceiver and to the detector and if the detector bandwidth is greater than the bandwidth of the received signals. In this case, detection sensitivity may be reduced when DSA transmissions are received during a time period when the DSA-enabled device is in a mode configured to detect transmissions from non-DSA sources.

The DSA engine module 4200 may coordinate communications between the DSA-enabled device 4000 and other cooperative DSA-enabled devices. One aspect of this coordination may be the association of each action of the DSA-enabled device 4000 with a specific context. For example, the DSA engine module 4200 may receive information from the environmental sensing module 4100 regarding the radio frequency (RF) environment 4010 observed by the DSA-enabled device 4000, environment information observed by the environmental sensing modules of other cooperative DSA-enabled devices, and similar data, and then use this data for classification, interference avoidance, and channelization of the spectrum for use by the DSA-enabled device 4000. The classification, interference avoidance, and channelization may be applied with respect to a DSA-enabled network context.

The DSA engine module 4200 also may include a scheduler 4210 to coordinate transmitting, receiving, and sensing times. For example, the scheduler 4210 may define various times during which the DSA-enabled device 4000 performs different operations, such as sending and receiving data and/or control information using the radio 4400, making observations about spectrum usage using the environmental sensing module (e.g., a detector or detectors) 4100 (and remote environmental sensing modules of other cooperating DSA-enabled devices), and performing analysis of RF environment information 4010 and signals observed by the DSA-enabled device 4000. The scheduler 4210 may be part of, or controlled by, the DSA engine module 4200, or it may be a separate module within the DSA-enabled device 4000.

The DSA engine module 4200 may include or control a spectrum manager 4220 to analyze signals or potential signals for which information is obtained by the DSA-enabled device 4000, analyze spectrum usage, and identify potential channels for use by the radio 4400. For example, the spectrum manager 4220 may include one or more signal classifiers 4240 and a channel manager 4230. Each signal classifier 4240 may receive some or all of the information from the environmental sensing module 4100, such as power levels and structures of signals in a region of spectrum observed by the environmental sensing module 4100. A signal classifier 4240 may use various RF filters, signal masks, prior classification results, demodulation, and other analysis techniques to identify signals contained in the information provided by the environmental sensing module 4100. For example, a signal classifier 4240 may discriminate between cooperative signals, non-cooperative DSA signals, and non-cooperative non-DSA signals. A signal classifier 4240 may then send data describing the presence or absence of signals and, if present, the types of signals in various channels to the channel manager 4230 or other modules of the DSA-enabled device 4000. A channel manager 4230 can use this information to select available candidate channels 4270 to provide to the communication coordinator 4250, which can then use the information to select channels for use and command 4280 the radio 4400 to behave accordingly.

A signal classifier 4240 also may detect a non-cooperative signal in a channel being used by the DSA-enabled device 4000. In response, a signal classifier 4240 or spectrum manager 4220 may send an immediate message 4290, such as a request to change channels, to the communication coordinator 4250. The request may cause the communication coordinator 4250 to initiate a change in the channel used by the DSA-enabled device for communication with other cooperative DSA-enabled devices.

As another example, a DSA engine 4200 (or one of its modules) may generate and coordinate an operating schedule of operation for the radio 4400 and one or more detectors 4100, and may do so in conjunction with or instead of the scheduler 4210. In some embodiments, a single transceiver may be used for spectrum sensing as well as communicating with other DSA-enabled devices. In such an embodiment, different components may control the transceiver during times when it is used to sense spectrum and when it is used to communicate.

Figure 5:
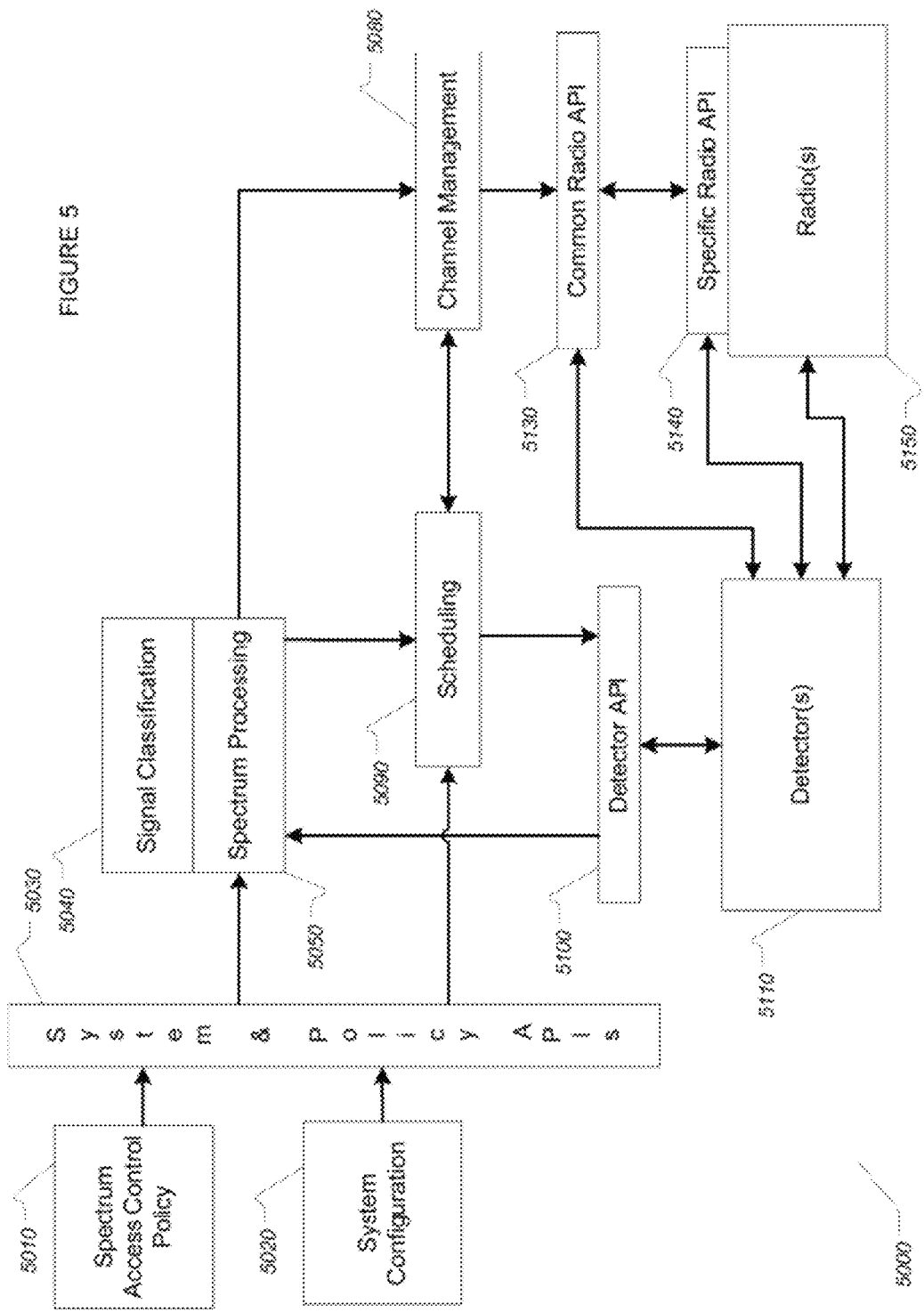
FIG. 5 shows a software schematic for an exemplary DSA-enabled device according to an embodiment of the invention.

FIG. 5 depicts an exemplary software schematic for a DSA-enabled device 5000 according to an embodiment of the invention. As can be seen by comparing FIG. 4 to FIG. 5, many of the modules in the DSA-enabled device can correspond to or be implemented partially or entirely by software components. For example, a spectrum manager 4220 may use signal classification 5040, spectrum processing 5050, channel management 5080, and other software components as shown, which correspond to modules in the spectrum manager 4220. As a specific example, spectrum processing 5050 can format detector data in a manner that allows for efficient use by the signal classifier 4240. It also can perform additional pre-processing tasks, such as calculating a max hold array for data received from one or more detectors 5110 and/or signal classifiers 4240.

The example software components can be implemented using one or more general purpose processors, or they may be implemented using specialty processors, such as Digital Signal Processor (DSP) chips or Field Programmable Gate Array (FPGA) processors. A single processor or other circuit can be used to implement a plurality of modules, or functionality related to a plurality of modules, or a plurality of processors can be used. In a specific exemplary embodiment of a DSA-enabled device, the system and policy Application Program Interfaces (APIs) 5030 useful for interface to spectrum access control policy 5010 and system configuration settings 5020, the detector API 5100, and common radio API 5130 are implemented using a general purpose processor, and the specific radio API 5140 that is useful to control operation of the radio hardware 5150 is implemented using a FPGA processor.

Internal APIs may be used to enable efficient modification and/or re-use of common software modules. For example, a detector API 5100 can be used to provide a consistent interface to a plurality of detectors or types of detectors so that other components, such as scheduling 5090 and spectrum processing 5050 do not need to be specifically adapted to each detector or detector type 5110.

It will be understood that although the functions of detectors within a DSA-enabled device and other aspects of the invention are described herein with reference to various modules, specific functionality may be implemented in different combinations of hardware and software than those specifically described for each module herein without departing from the scope of the invention.

1.6 Signal Characteristics

Figure 6:
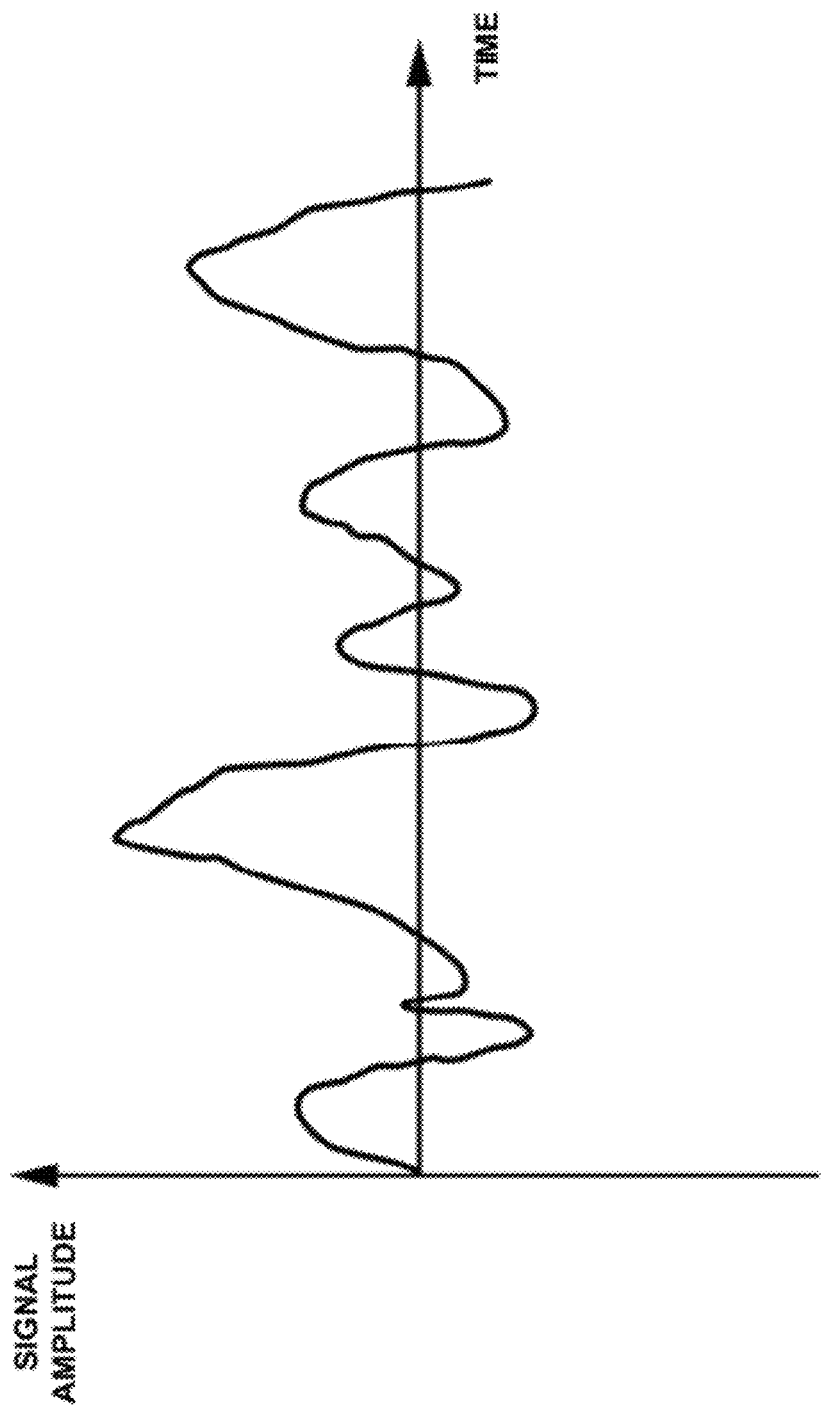
FIG. 6 is a graph depicting the signal amplitude versus time of combined strong and weak signals.

As shown in FIG. 6, radio frequency electromagnetic energy received by a detector has an amplitude (signal strength) that typically varies over time. This creates a time-domain waveform made up from the combination of individual signal and noise waveforms comprising the energy received. In a time-domain view, such as that shown in FIG. 6, separating the signal from the noise, or one signal from another, is difficult. In order to tell one signal from another, or to have any chance of distinguishing signal from noise, the received energy must be converted from a time-domain view into a frequency-domain view, and the signals at various frequencies involved separated from one another. In DSA-enabled devices this is typically done using Fast Fourier Transforms (FFTs). The range of frequencies represented by the FFT bins is referred to herein as the "Detector Spectrum Window".

Figure 7:
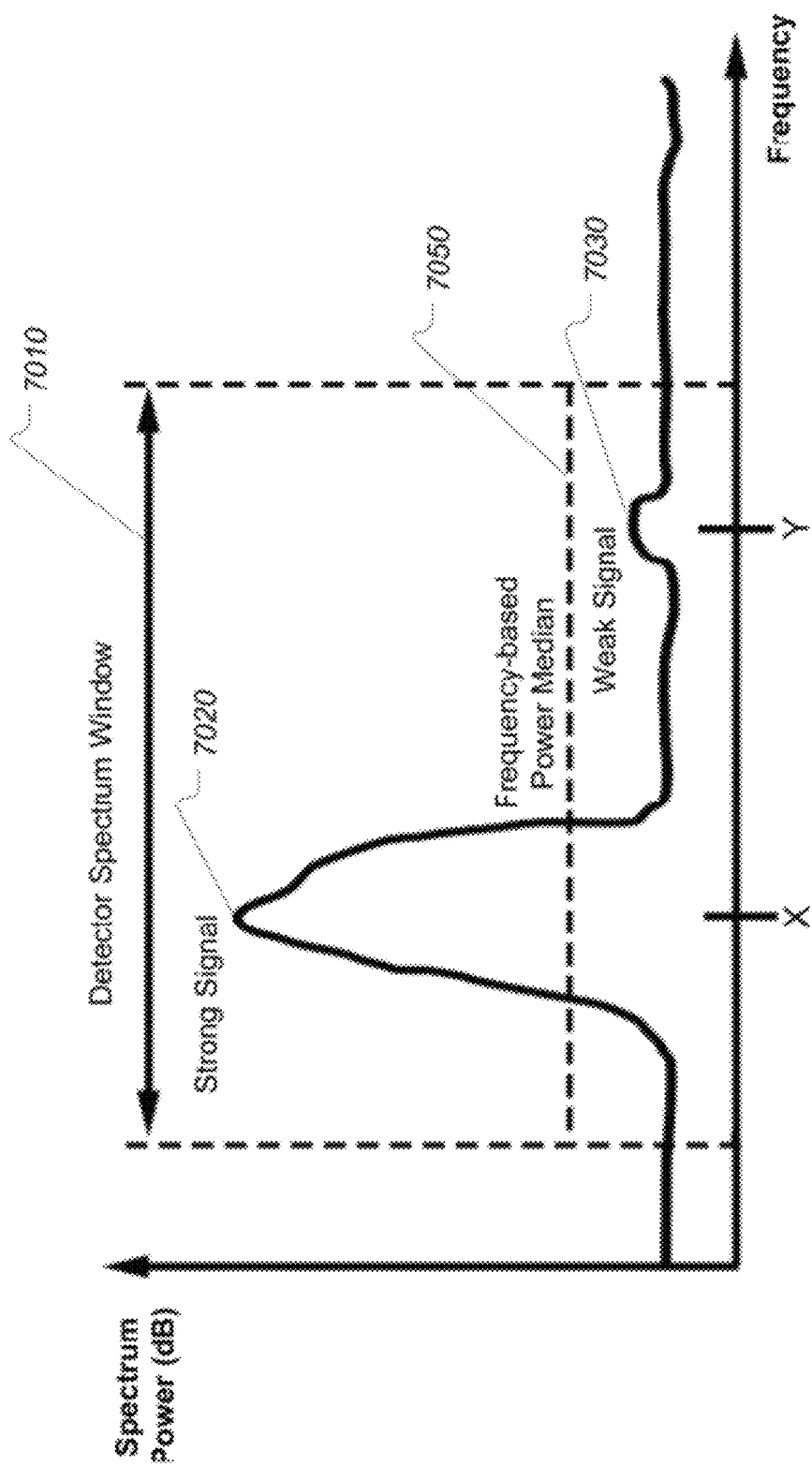
FIG. 7 is a graph depicting FFT processing results of combined strong and weak signals showing the frequency-domain median power value.

FIG. 7 shows a frequency-domain graph for a specific detector spectrum window 7010 of the waveform from FIG. 6 over the sample period shown in FIG. 6. In this graph, unlike in the time-domain graph (FIG. 6), it is clear that there are two signals and some background noise ("noise floor") making up the waveform. There is a relatively powerful signal 7020 at frequency "X", and a relatively weak signal 7030 at frequency "Y". The noise floor is shown by the relatively uniform non-zero power levels at all other frequencies. The median power level for all frequencies in the detector spectrum window is shown by the dashed line 7050.

Figure 8:
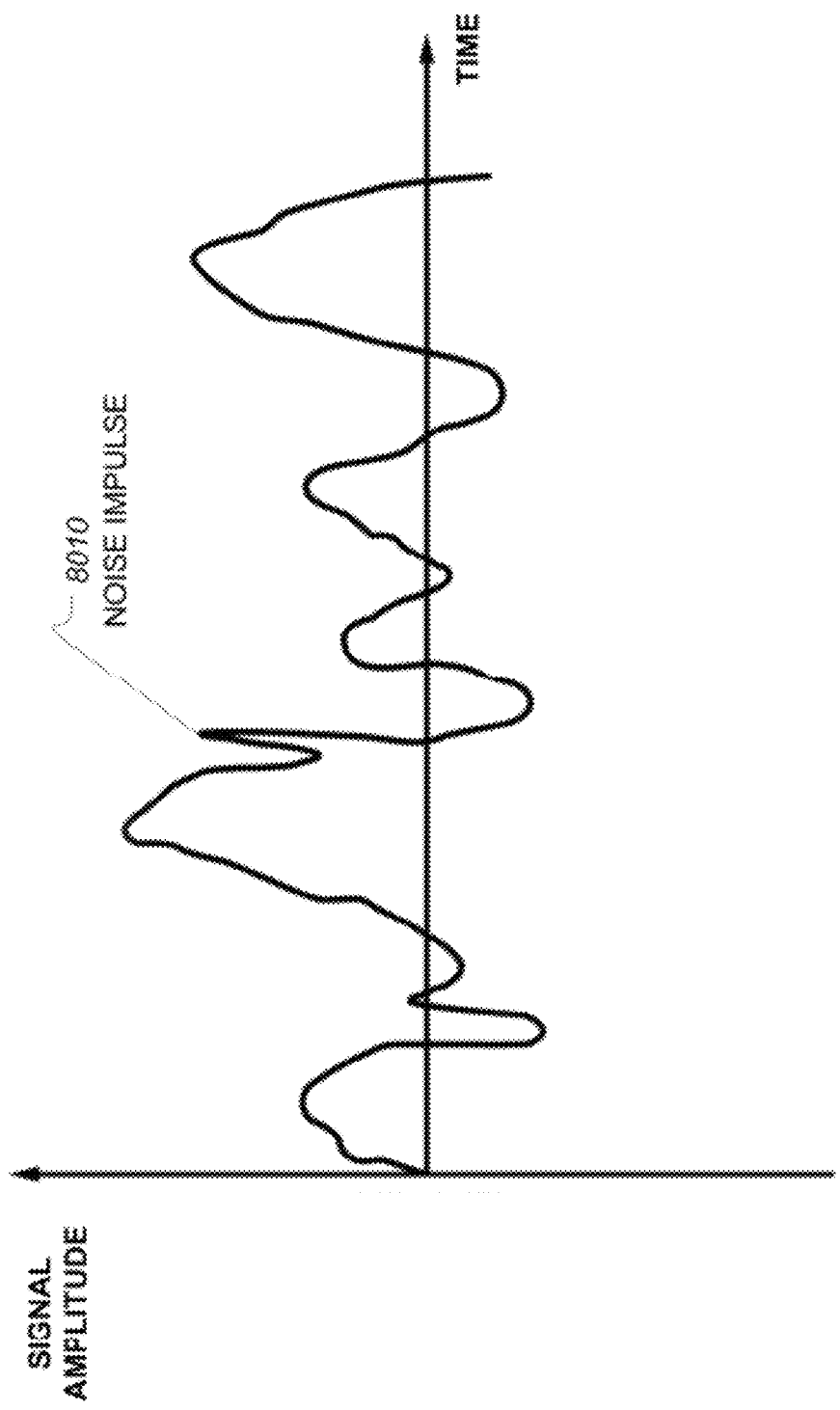
FIG. 8 is a graph depicting the signal amplitude versus time of combined strong and weak signals along with a brief noise impulse.
Figure 9:
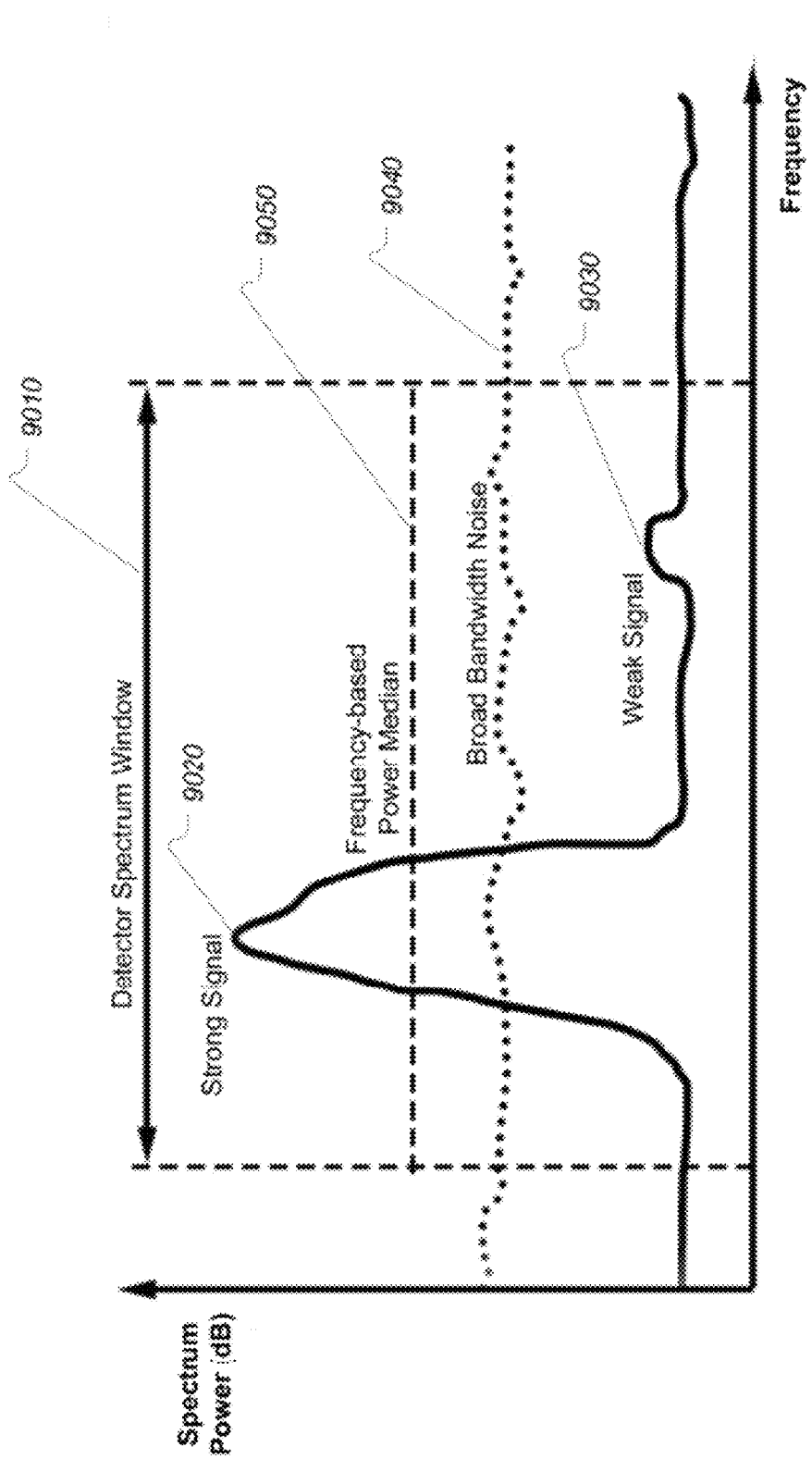
FIG. 9 is a graph depicting FFT processing of combined strong and weak signals along with a brief noise impulse showing the frequency-domain median power value.

FIG. 8 shows a time-domain waveform similar to that of FIG. 6, but with an impulse noise event 8010 at one point during the sample period. This impulse noise 8010 briefly increases the measured amplitude, and could be mistaken for a signal due to the power it adds to the sampled data. However, when viewed in the frequency-domain, as shown by FIG. 9, its broad bandwidth 9040, more than spanning the detector spectrum window 9010 results in a large noise level that is above the weak signal 9030. Hence, the DSA system would determine that there are weak signals in all channels within the detector spectrum window and have a high false alarm rate.

An RF spur is characterized by an RF signal that fills a narrow frequency band, potentially less than a channel width. A spur's amplitude may vary on a one-time, periodic, or irregular basis, or be constant. Spurs typically may be identified by a high energy spike in a narrow group of FFT bins (typically, although not necessarily, limited to one bin).

RF impulses are characterized by wide-band RF energy being present above the noise floor. RF impulses span wide frequency bands, but are of limited time duration. RF Impulses may be one-time events, or they may repeat periodically. RF impulses often may generate high RF energy false alarms in traditional energy-based DSA-enabled device detectors. This typically results in the channels involved being considered unusable by the DSA-enabled devices because the DSA-enabled device incorrectly classifies the channel as occupied by a signal based on the detected power.

1.7 Spur and Impulse Rejection Detectors

Proper functioning of DSA-enabled devices requires that such devices include an ability to avoid interfering with other spectrum users and have a low false alarm rate in order to make efficient use of spectrum. Satisfying these requirements involves accurately sensing use of spectrum and identifying characteristics of the sensed signal. Intermittent use of the spectrum by other devices and noise can cause energy to be sensed in a particular channel. Noise can be caused by man-made sources, such as arcing power lines, spark plugs in gasoline engines, and microwave ovens, or be caused by natural events, such as lightning strikes.

When the sensed energy is created by another communication device, the channel should be considered in-use and avoided for DSA use. When the energy sensed includes noise, the channel should not be considered in-use and can be used at times when the noise is not so severe as to mask signals. The problem may be further compounded by the fact that an in-use channel can also have noise present on it, so simply determining that energy detected in a channel constitutes noise is not sufficient. Conventional devices may treat energy sensed in a channel as indicating the channel is in-use and as a result may avoid use of the channel. When the energy sensed includes noise, this can result in usable spectrum remaining unused. Devices and techniques as disclosed herein can reject both spur and impulse noise, without mistakenly determining the noise-affected channels to be in-use.

Figure 10:
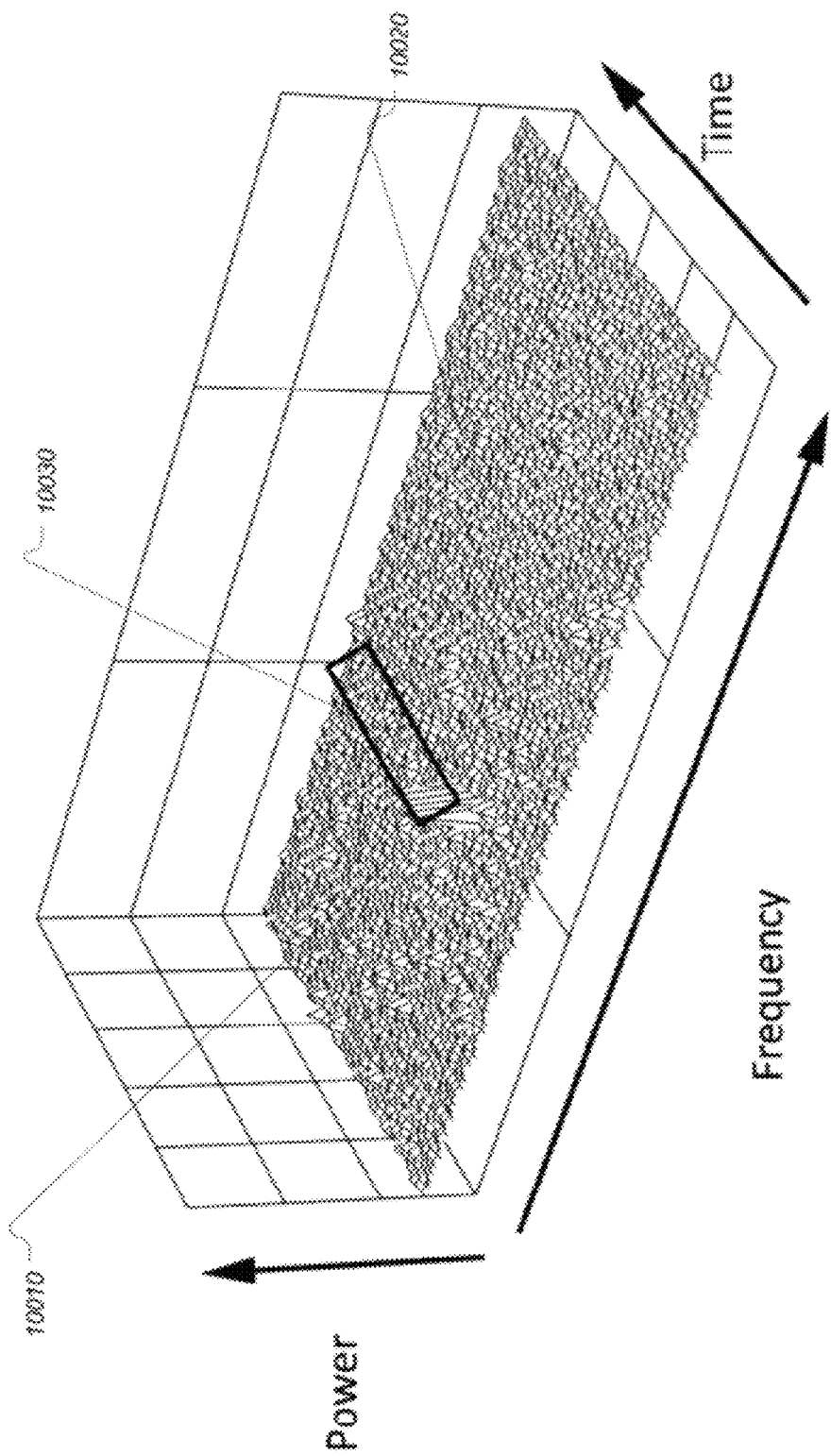
FIG. 10 is a graph depicting time varying amplitude spur noise, and the usable spectrum it can mask with prior art devices.

FIG. 10 is a graph showing spur noise 10010, where the energy level sensed at a narrow band of frequencies, even over only a small percentage of a channel's width, rises above the noise floor 10020. The spur noise has a large energy level compared to the noise floor so a typical prior art DSA-enabled device using only an energy-based detector might consider the channel or channels affected by the spur noise to be in-use, and would therefore lose the use of the future channel space that is not affected by such short duration spur noise 10030.

1.7.1 Spur Noise Rejection

Spur rejection can be done using the following method. RF energy, both signal and noise, are collected, typically using an antenna, optionally amplified, and then sampled by a detector in an environmental sensing module. Sampling is typically done by an analog to digital convertor (A/D convertor) that measures the input RF energy level at a desired rate, and supplies the series of measured instantaneous RF energy values as outputs. In some embodiments, sampling of the collected energy is performed at rates above the Nyquist rate. The Nyquist rate is the minimum sampling rate required to avoid aliasing, and is equal to twice the highest frequency component contained within the RF energy to be sampled. It may be particularly advantageous to sample at rates at multiples of the Nyquist rate in order to improve detection of spurs as opposed to other signal features. For example, using these techniques while sampling at a rate five or more times the Nyquist rate typically provides good spur identification characteristics.

An FFT is performed on the sampled instantaneous RF energy values to determine the power spectrum of the RF energy.

The output of the FFT processing includes a power spectrum of the RF energy where the power at each frequency is divided into frequency "bins". Each bin specifies the total RF energy of the set of component frequencies associated with the bin. The transformed RF energy measurements are then further processed to identify the bins within a certain channel width that contain energy values above an energy threshold test statistic. The channel width is typically set to be equal to the approximate channel bandwidth of any signal expected in the frequency range covered by the bins in question. Typically, the FFT bin size is selected so that there are many bins (for example 10 or more) within the channel bandwidth of expected signals. Spur rejection is accomplished by selecting the (N) bins with the largest energy values within the channel width and replacing their amplitude values with a predetermined value, such as the calculated noise floor power, or the average of the remaining bins. The number of bins selected (N) may be calculated based upon one or more characteristics of the operating environment of the DSA-enabled device and/or the input signals being detected, may be pre-configured, selected from a table of predefined values based upon aspects of the DSA-enabled device's operating environment, established by policy, determined by other DSA-enabled device's module(s), or by a combination of these methods. The resulting set of modified bins is then used to conduct signal detection. This may be performed within the noise-excision detector. Alternatively, the set of modified bins may be passed to other DSA-enabled device modules such as a signal classifier module.

A benefit of the described approach is that it may improve performance of a signal detector by eliminating all or most of the man-made noise types, or natural noise with similar characteristics, while reducing by only a small fraction the amplitude of any signal within the signal bandwidth. The value of the optimum (N) value varies with the channel bandwidth of the signal to be detected compared to the bin bandwidth. If (N) is too small, then not enough spur noise is rejected. If (N) is too large, then too much signal can be rejected. An example process for automatically determining (N) is discussed below.

Figure 11:
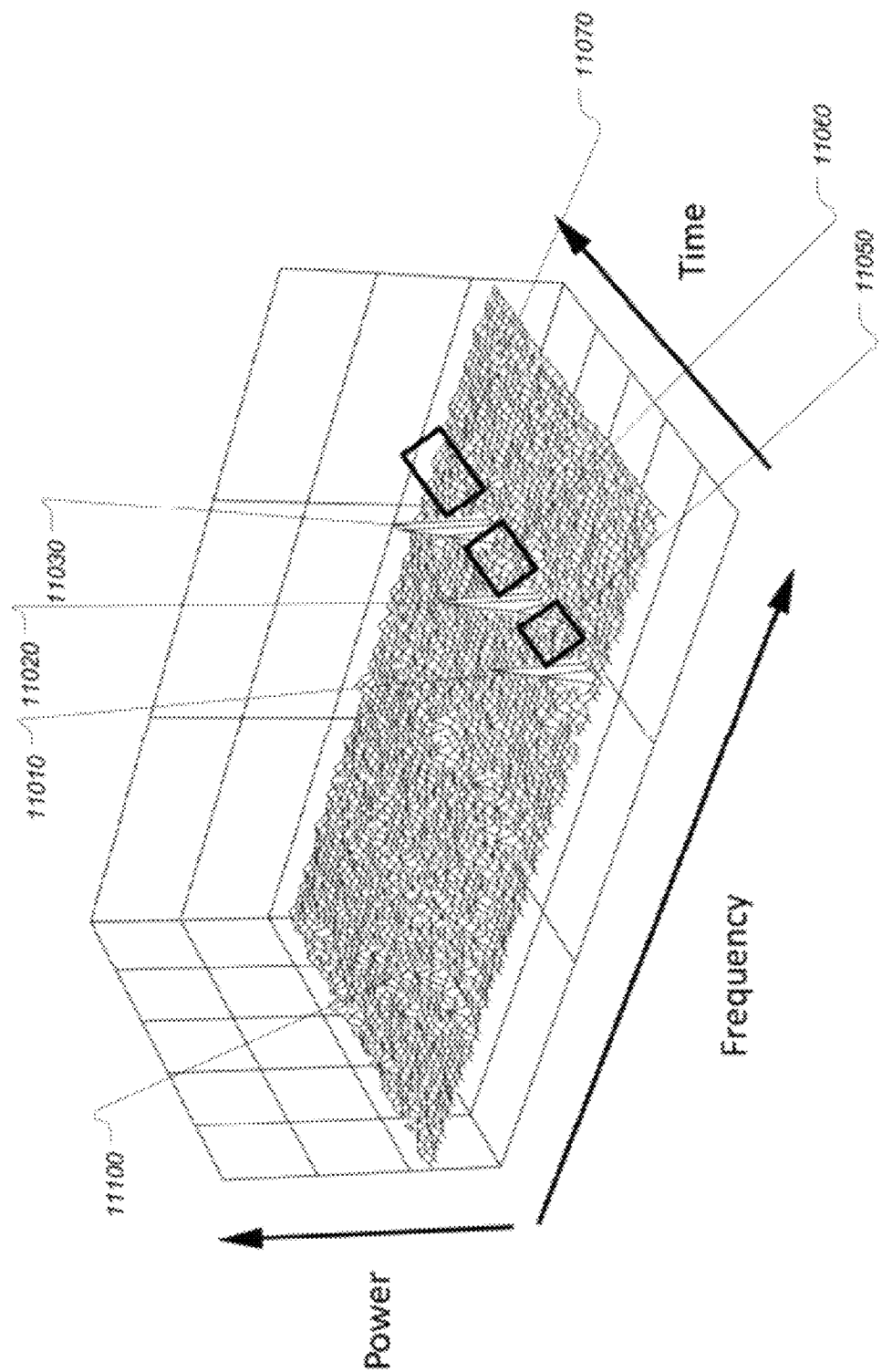
FIG. 11 is a graph depicting a series of spur noise events, and the usable spectrum these can mask with prior art devices.

FIG. 11 is a graph showing an example of narrow bandwidth spur noise where the noise amplitude varies above the noise floor over time (11100). The above described spur rejection method operates effectively whether the spurs have constant amplitude, have amplitude modulation, or if they are slowly varying in frequency. No training of an excision algorithm is required, nor are assumptions about spur characteristics necessary, though it typically is presumed that spurs occupy less than the full channel width. The spectrum space available for signal detection or recoverable for DSA-enabled device use (11050, 11060, 11070) occurs between the spurs (11010, 11020, 11030).

1.7.2 Impulse Noise Rejection

RF impulse noise rejection includes techniques that reduce false alarm generation without interfering with the DSA-enabled device's ability to detect spectrum use and to abandon a channel when spectrum use is detected. A DSA-enabled device may use the frequency spectrum at full sensitivity when not blocked by impulse noise, and with reduced sensitivity during periods when RF impulse noise is present.

An RF impulse is identifiable by a high energy spike of short duration across a group of FFT bins (typically 100's of MHz wide). The RF impulse duration is typically several nanoseconds long, which is much shorter than in-use packet length or analog signal length. Thus an RF impulse typically lasts a very small fraction of time compared to an expected signal.

Figure 15A:
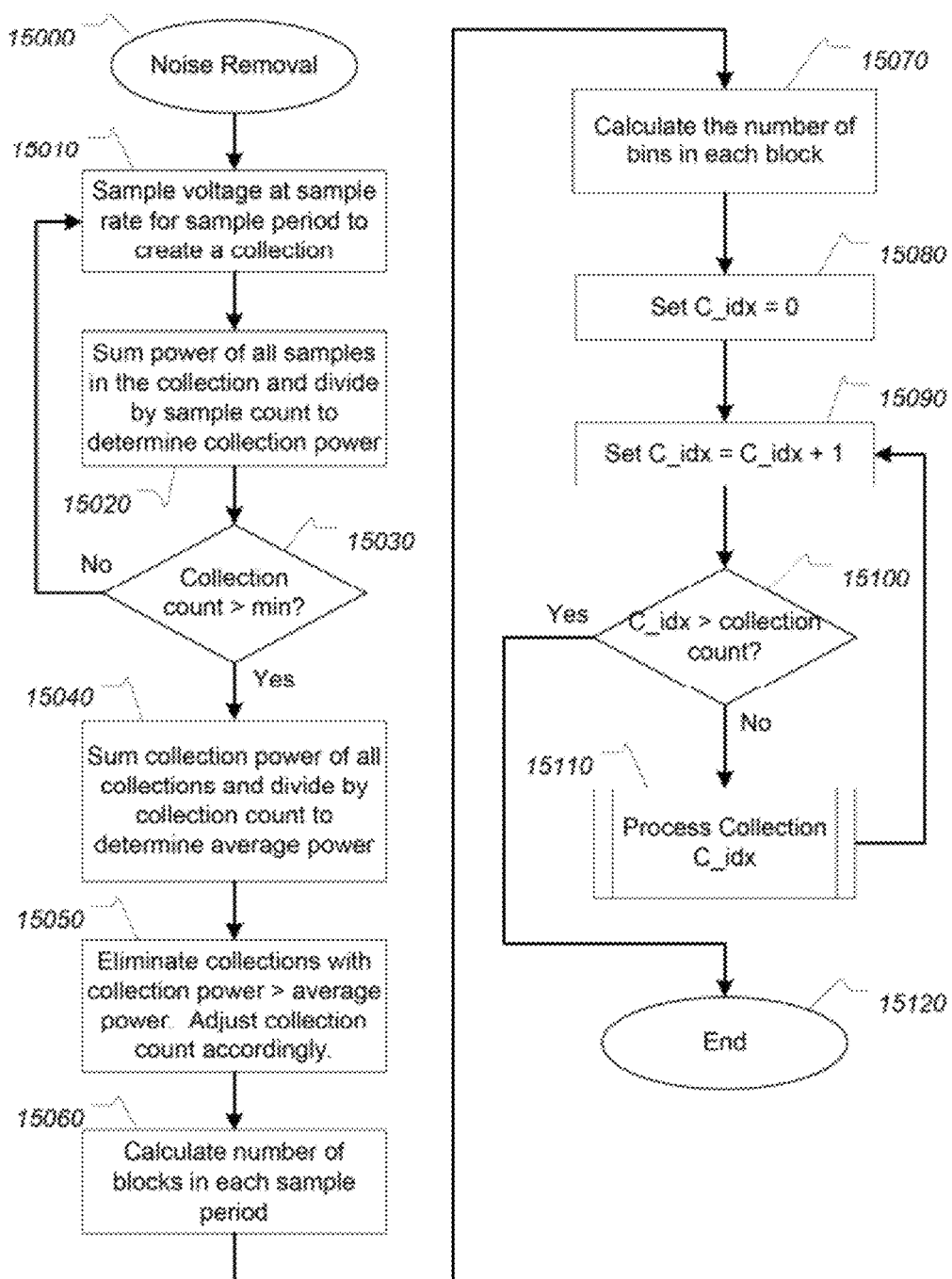
FIG. 15*a* is a flowchart of an exemplary noise excision technique.

An example method of RF impulse excision may include the technique described in FIG. 15*a* (steps 15010-15050). This method uses an energy detector and oversampling of the signal as opposed to an FFT-based approach as described below. Both methods may provide equivalent results; in various configurations, the particular technique may be selected based upon implementation considerations such as the relative cost required to sample compared to the relative cost to compute FFTs. These costs may include, for example, the amount of power required, the amount of heat generated, the number of available processor cycles, and other factors understood by those skilled in the art.

Figure 12:
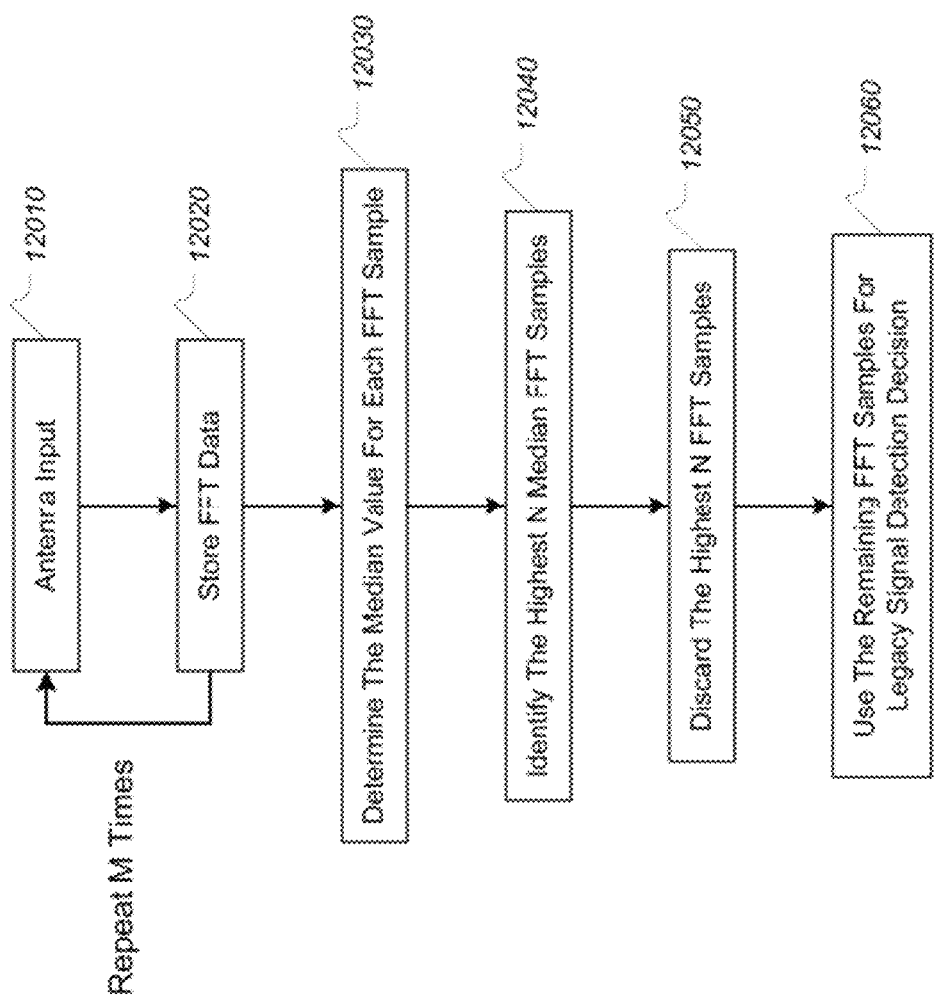
FIG. 12 is a flowchart of an exemplary process for excising broad bandwidth man made noise.

Impulse noise rejection also can be performed using the method shown in FIG. 12. This method uses a lower sample rate, but performs an FFT on each sample collected. The DSA-enabled device may take one or more measurements of the signal (12010), and forms a plurality of (M) FFT views of the spectrum (12020). An FFT view is the set of FFT bins created by performing an FFT on a set of signal measurements. For each FFT view, the frequency domain median power value over all the FFT bins is determined (12030). FFT views with broad bandwidth impulse noise have a higher frequency domain median power value than FFT views with narrow bandwidth noise or substantially uniform noise, as was shown in FIG. 9. Of the (M) FFT views, the (N) FFT views with the highest frequency domain median power value (12040) are discarded (12050). These discarded FFT views are deemed to contain impulse noise. The remaining FFT views may be used to detect signals of interest (12060). The detection of signals of interest may be performed within the detector, or may be performed by another module of the DSA-enabled device.

In some cases the frequency domain median power value may be used instead of the time domain median power value because the frequency domain method improves the sensitivity to detect weak signals within the same detection bandwidth in the presence of strong signals. In the time domain, an impulse event typically is difficult to detect because the signal amplitude can be dominated by a strong signal. If the time domain median power were used with the signals shown in FIG. 6 (no impulse event) and FIG. 8 (with an impulse event), then the median values would be nearly identical. Accordingly, the time domain median power metric may be undesirable for determining whether an impulse noise event has occurred. In some implementations, it is preferable to use the mean power instead of median power. The techniques described herein may advantageously use either mean or medium power calculations, or a combination thereof.

As described above, FIG. 9 shows the FFT spectrum and the frequency domain median power value with an included impulse noise event. This figure shows that the impulse noise event has a mean broadband noise power level 9040 that is larger than the peak power 9030 of the weak signal and prevents the weak signal from being detected. Note that the frequency domain median power value 9050 in this case is significantly higher than the frequency domain median power value with no impulse noise event (shown in FIG. 7). Hence, the frequency domain median power metric is a good method to determine that an impulse noise event has occurred in the sample period.

A Signal Detection Decision module uses the FFT views that have frequency domain median power values that are below the high power cut off threshold in one of several different approaches. One approach is to average the remaining FFT measurements, which minimizes the noise variance and allows for a lower detection threshold for a given false alarm rate. Another approach is to take the maximum of the remaining FFT views to maximize the detection probability. The Signal Detection Module may be included within the detector, or may be part of another DSA-enabled device's modules. The choice of approach in the Signal Detection Decision module depends on the DSA-enabled device architecture and desired performance, which can depend on regulatory requirements or other policy factors.

1.7.3 Combined Impulse Noise and Spur Noise Rejection

Figure 13:
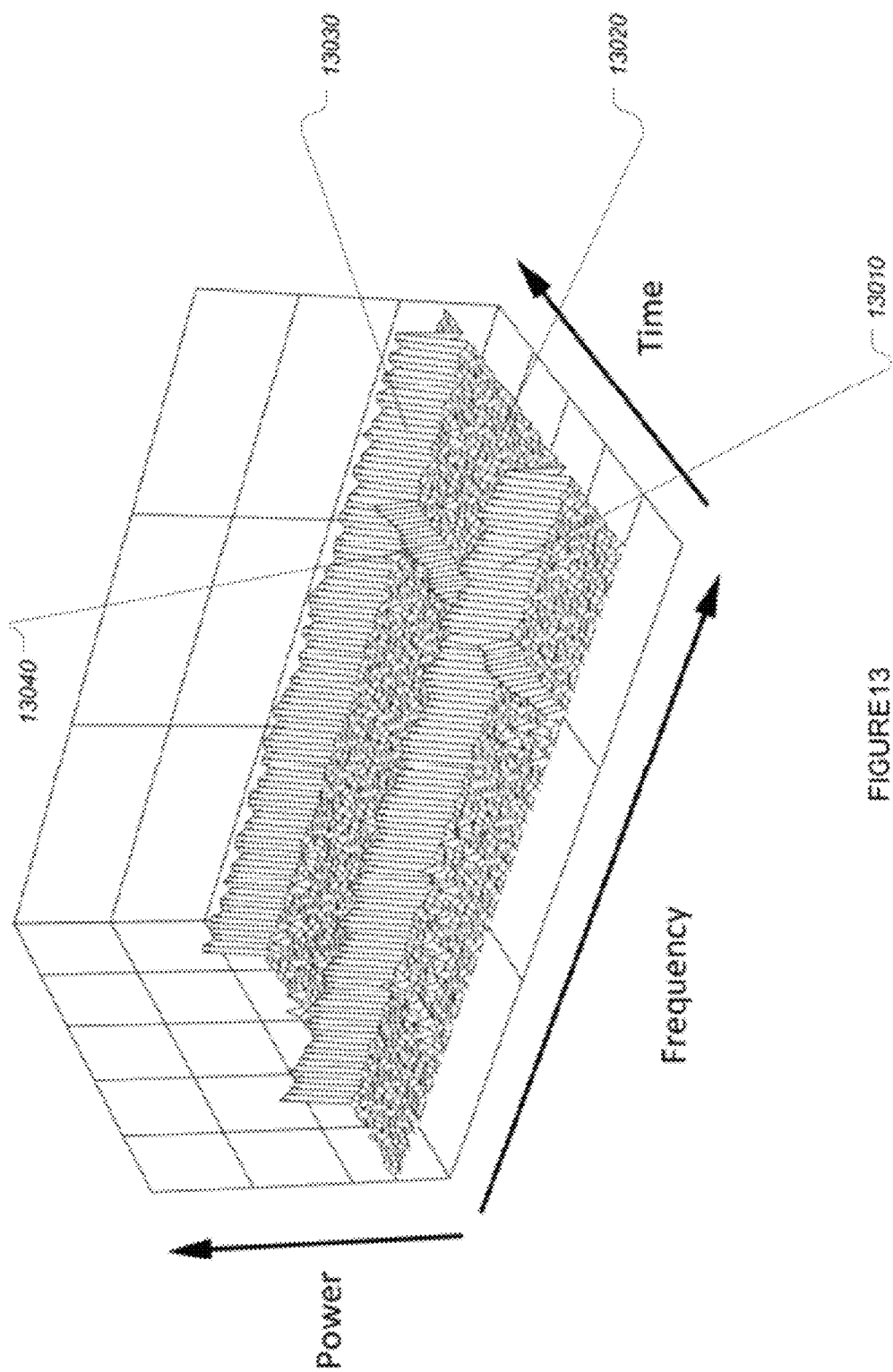
FIG. 13 is a graph depicting a pair of impulse noise events and a long duration spur noise event, and the usable spectrum these can mask with prior art devices.

Both impulse noise and spur noise can occur simultaneously as shown in FIG. 13, which includes impulse noise peaks 13010 and 13030 above the noise floor 13020 as well as a spur noise peak 13040. Each noise type may be generated, for example, by different sources that happen to occur in proximity to the DSA-enabled device.

Figure 14:
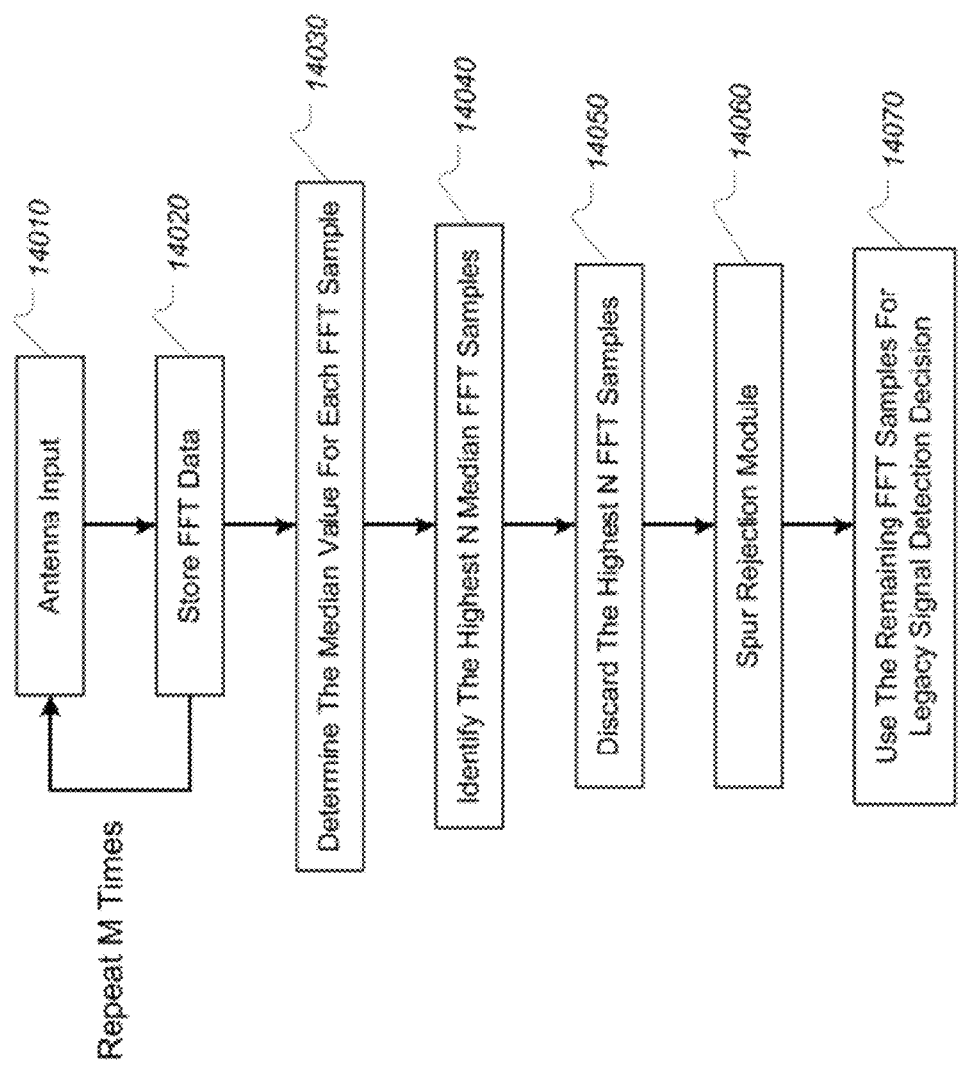
FIG. 14 is a flowchart of an exemplary process for excising broad bandwidth man made noise and spur noise.

Combined impulse noise and spur noise rejection may be performed by the method shown in FIG. 14. This method is a combination of the previously described impulse noise rejection method and the previously described spur noise rejection methods. As shown in FIG. 14, the impulse noise method where the lowest frequency domain median power value FFT views are selected may be performed first 14010-14050. Then the spur rejection module (described above) is performed on each remaining FFT view 14060. Then the Signal Detection Decision module as described above may operate on the remaining FFT views 14070 to provide an overall decision about the presence of a signal.

FIG. 15*a* is a flowchart that describes an example method of operating a detector that eliminates or reduces the effect of both impulse and spur noise from the signal in a channel, especially that caused by man-made effects 15000. It uses a combination of the noise elimination techniques described herein, in particular, broadband impulse noise excision using oversampling, and spur noise excision. The process begins by collecting samples of voltages present on antenna inputs (step 15010). Samples are collected at a sample rate that exceeds the Nyquist rate of the highest frequency to be considered. The sample period is at least ten times the time required for one cycle of the lowest frequency to be considered, and is typically on the order of 1 millisecond (ms). Each sample period may be contiguous, or may be coordinated by the DSA engine or other component, for example, to be scheduled during the gap or other expected quiet periods. The samples collected during a single sample period are referred to herein as a "collection". The next step is to sum the power of all samples in a collection, and then to divide the total by the number of samples to determine a mean collection power value (step 15020). Steps 15010 and 15020 are repeated until at least a minimum number of collections have been accumulated (step 15030). A typical value for the minimum number of collections is four, although more collections may be taken. It is advantageous to minimize the number of collections taken in order to reduce the amount of time and/or power required by the detector. In some embodiments, the minimum number of collections required is configurable, or dynamically adjustable. Dynamic adjustments may occur based upon inputs from the DSA engine or other DSA-enabled device modules.

Once the selected number of collections has been accumulated, the power values of all collections are summed, and divided by the number of collections to determine an average collection power (step 15040). Collections with collection power values that exceed the average power are eliminated from further consideration, and the collection count adjusted downward to account for those removed (step 15050). In some embodiments only those collections that exceed the average power by a specified amount are eliminated. The elimination of collections with higher than average power values removes impulse noise, since impulse noise, being broad band, has a larger effect on collection power than narrower band signals or noise. Since a number of collections will have been accumulated over a time span that is long (several milliseconds) compared to the duration of typical impulse noise events (generally less than half a microsecond), this elimination does not adversely affect the ability to detect signals. In general, half or more of the collections will remain.

In some embodiments, the minimum number of collections required, or the threshold above average required for elimination, can be automatically adjusted based on the ratio of collections eliminated to those retained.

The next steps deal with the samples in the frequency domain, rather than the time domain. The first step is to calculate the number of blocks in each sample period 15060. This is done by dividing the frequency range of interest by the channel bandwidth of possible signals of interest, and dropping any fractional blocks that may occur. The number of bins in each block is then determined 15070. Bin bandwidth is generally fixed, and typically one kilohertz (kHz). By dividing the channel bandwidth by the bin bandwidth, the number of bins per block can be calculated. A block may include the entire FFT view, or may include a subset of the view based upon the desired frequency range.

Each of the collections may then be processed separately, such as by initializing an index to zero 15080, and then entering a loop that increments the index 15090, checks to see if all collections have been processed 15100, and processes the indexed collection 15110 by the method described below. When all collections have been processed 15100, the process is complete 15120.

Figure 15B:
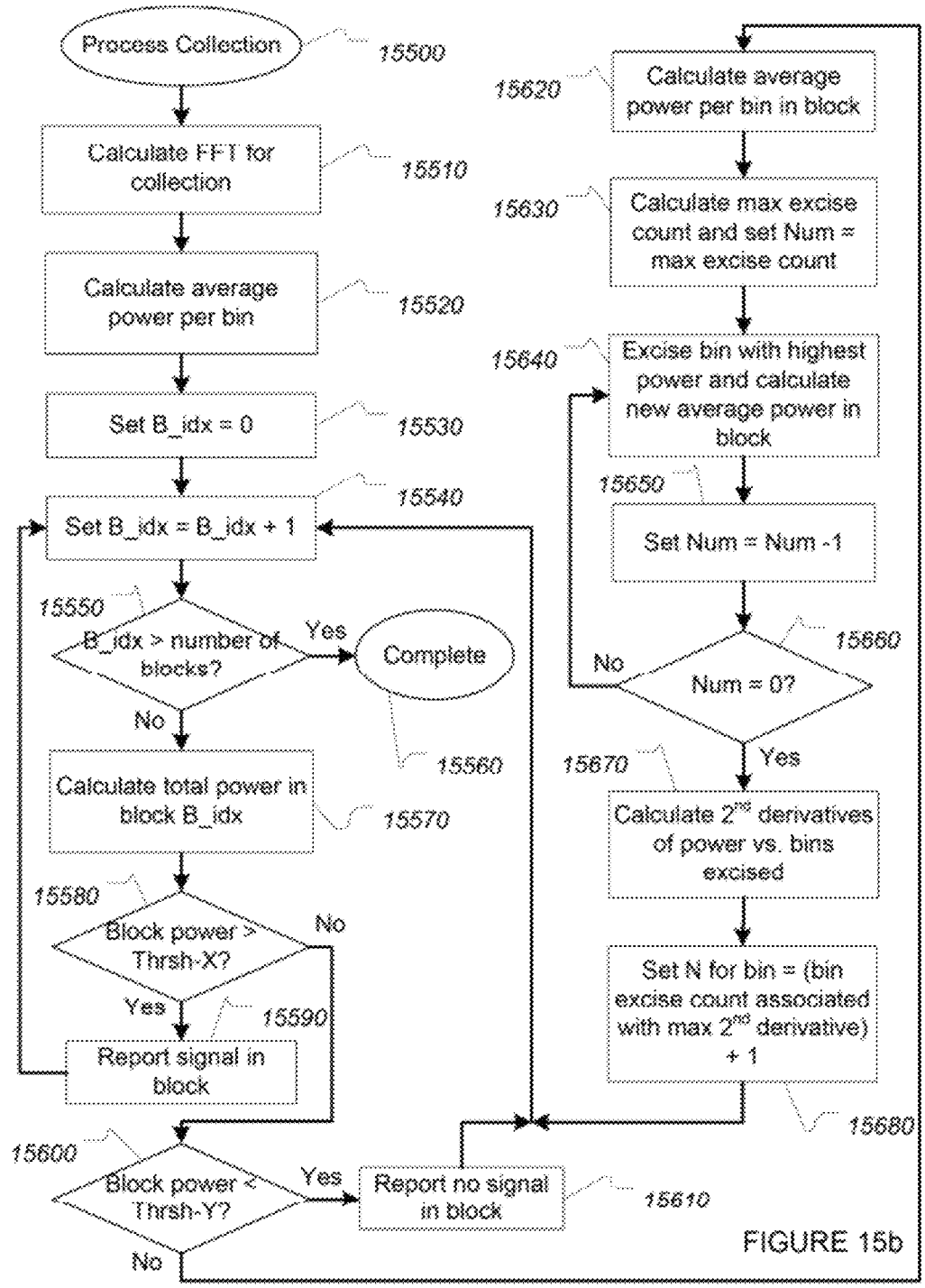
FIG. 15*b* is a flowchart of an exemplary collection processing step used by the exemplary noise excision technique of FIG. 15*a*.

FIG. 15b is a flowchart showing an exemplary method for processing a single collection 15500. The first step is to calculate an FFT for the collection 15510. This results in a set of FFT bins, each of which contains a value representing the power at the associated frequency during a specific sample period. The next step is to calculate the average power per bin 15520. This can be done by adding the power values of all bins in the sample period, and dividing by the number of bins. The next part of the process involves calculations on each block in the sample period, so an index is initialized to zero 15530, and the loop entered. The loop includes the steps of incrementing the index 15540, and checking to see if all blocks have been processed 15550. If they have, the process is complete 15560. If blocks remain to be processed 15550, the loop continues by calculating the total power in the block 15570 (e.g. by adding the values of all bins in the block), and comparing the total power of the block to a high threshold value 15580. If the total power exceeds the high threshold, an assumption can be made that there is a strong signal in the block 15590, and no further processing is required, so the loop continues to the next block 15540. Since impulse noise has previously been eliminated, the remaining noise tends to be narrow bandwidth compared with signals of interest, so the high threshold test is unlikely to be passed in the absence of a signal, even if there is noise in the channel.

If the total power does not exceed the high threshold 15580, a check is made to see if the total power is below a low threshold 15600. If it is, it can be assumed that there is no signal in the channel during the sample period 15610, and no further processing is required, so the loop continues to the next block 15540.

If the total power is between the low threshold and the high threshold, processing proceeds to calculate the average power per bin in the block 15620 for use in comparisons with each bin. A maximum excise count is determined 15630, for example by multiplying the bins per block count by a fixed value, such as 0.5. As another example, the maximum excise count can be determined by a table lookup or function that couples channel frequency to excise count, by recent experience of optimal bin excise count (e.g. from adjacent blocks, from recent collections processed, etc.), or by other means as will be apparent to those with skill in the art. A loop is then entered where the bin with the highest power value is eliminated from consideration, and a new average power for the block is calculated 15640, and the maximum excise count value is decremented 15650. A record is kept of the average power vs. the number of bins excised in the loop. This loop continues until the maximum excise count value reaches zero 15660. The next step is to calculate the second derivative of power vs. bins excised 15670, to determine how rapidly the rate of change of average power is changing with each additional bin excised. The optimal bin excise number for the block is then determined by identifying the excise count associated with the maximal value of the second derivative and adding one 15680. The block processing loop then continues by checking for a next block 15540, and processing it if there is one 15550, or ending the process if all block in the sample period have been processed 15560.

Once an optimal value for (N) for a given scenario has been selected or determined, these (N) bins can be excised from future bin sets to remove man-made and similar noise and permit detection of signals or a determination that such signals are not present. In some embodiments, the determination of optimal (N) values is repeated periodically. In some of these embodiments the periodicity of optimal (N) value determination is fixed. In some embodiments the periodicity of optimal (N) value determination is calculated based on the rate of change of optimal (N) observed over time. In some embodiments, the value of (N) may be fixed, input manually by a user, or may be determined from a set of fixed values based on characteristics of the signal or other factors.

In some cases, the optimal value of (N) may be calculated using information from bins from a plurality of blocks. In some embodiments, the determination of optimal (N) values is based on the average value over many blocks since the man-made noise features are usefully a weak function of frequency. Other statistical means of combining blocks also may be used.

EXAMPLES

The following examples are provided to illustrate certain aspects of the present invention and to aid those of skill in the art in the art in practicing the invention. These examples are in no way to be considered to limit the scope of the invention in any manner.

1.7.4 Spur Noise Rejection Example

A tradeoff can be made in deciding on the number of bins to discard, (N), when performing spur detection and elimination. Increasing (N) reduces the noise level (which reduces the false alarm rate) but also reduces the energy of signals within the signal channel width (which reduces the signal detection probability). An optimum value exists for any specific scenario that provides the best false alarm and detection probability characteristics.

Figure 16:
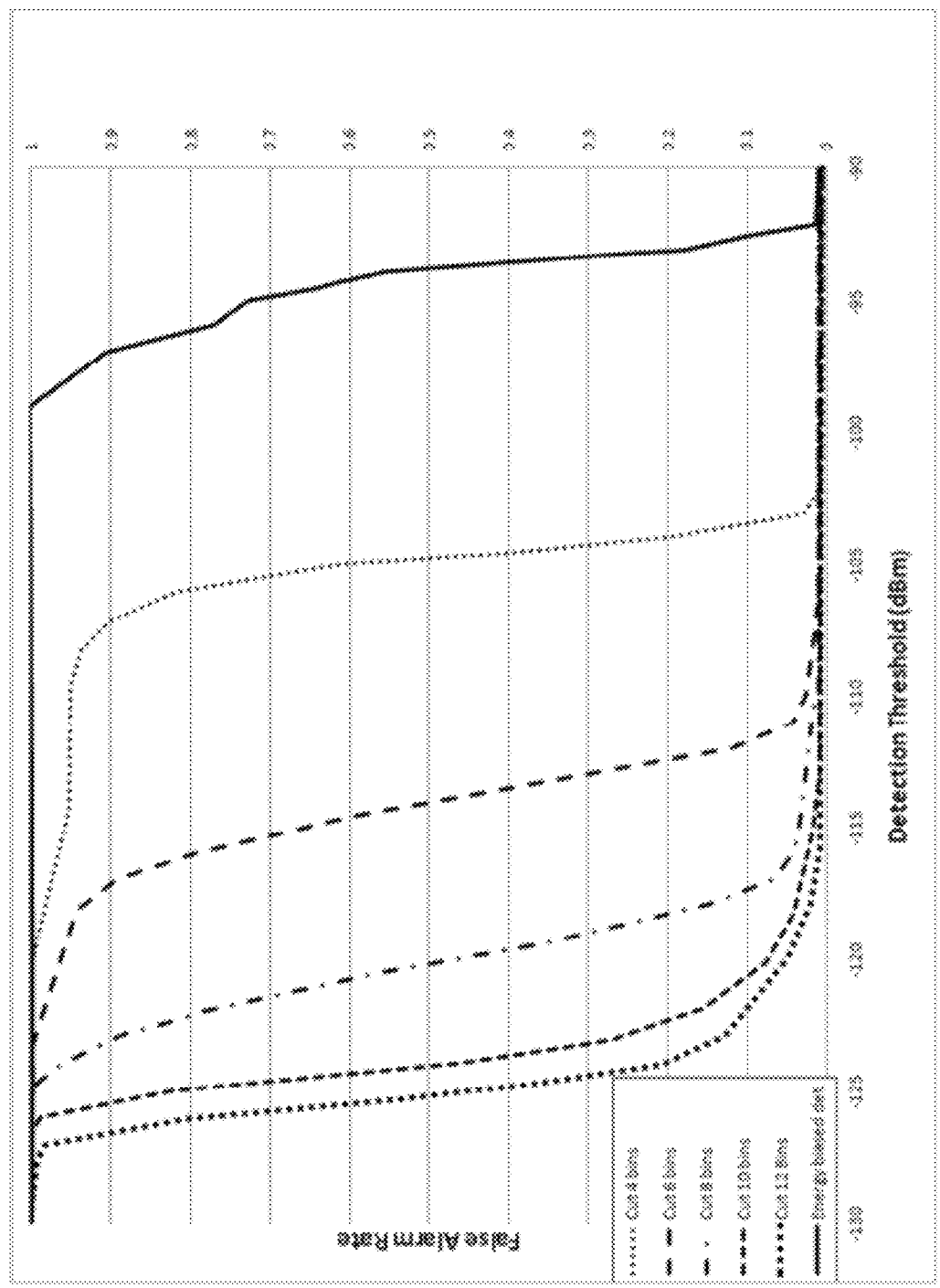
FIG. 16 is a graph depicting the "false alarm" rate for different detector FFT bin excision rate configurations.

As an example, a detector may be designed for a 25 kHz bandwidth channel using an FFT with 1 kHz bin sizes. A tradeoff can be made when determining how many 1-kHz FFT bins (N) to be excised. Ideally, by selecting an appropriate value of (N), the high-power noise spurs are eliminated from consideration while the signal under detection is still passed through the remaining bins for reliable detection. That is, the false alarm rate is significantly reduced while maintaining a high detection rate. However, when too many FFT bins are excised, the false alarm rate is reduced at the cost of a decreased detection rate. For a specific application, it is desirable to pre-determine the minimum allowed detection rate for the signal FIG. 16 is a graph showing the Percentage of False Alarms Rate vs. Detection Threshold (in dBm) when excising the top (N) 1-kHz FFT bins in a 25 kHz channel, for N=4, 6, 8, 10, and 12, based on example measured data where there was noise and no signals. As compared to an energy based detector, up to 25 dB performance gain is achieved when the required Percentage of False Alarms Rate is less than 1%.

Figure 17:
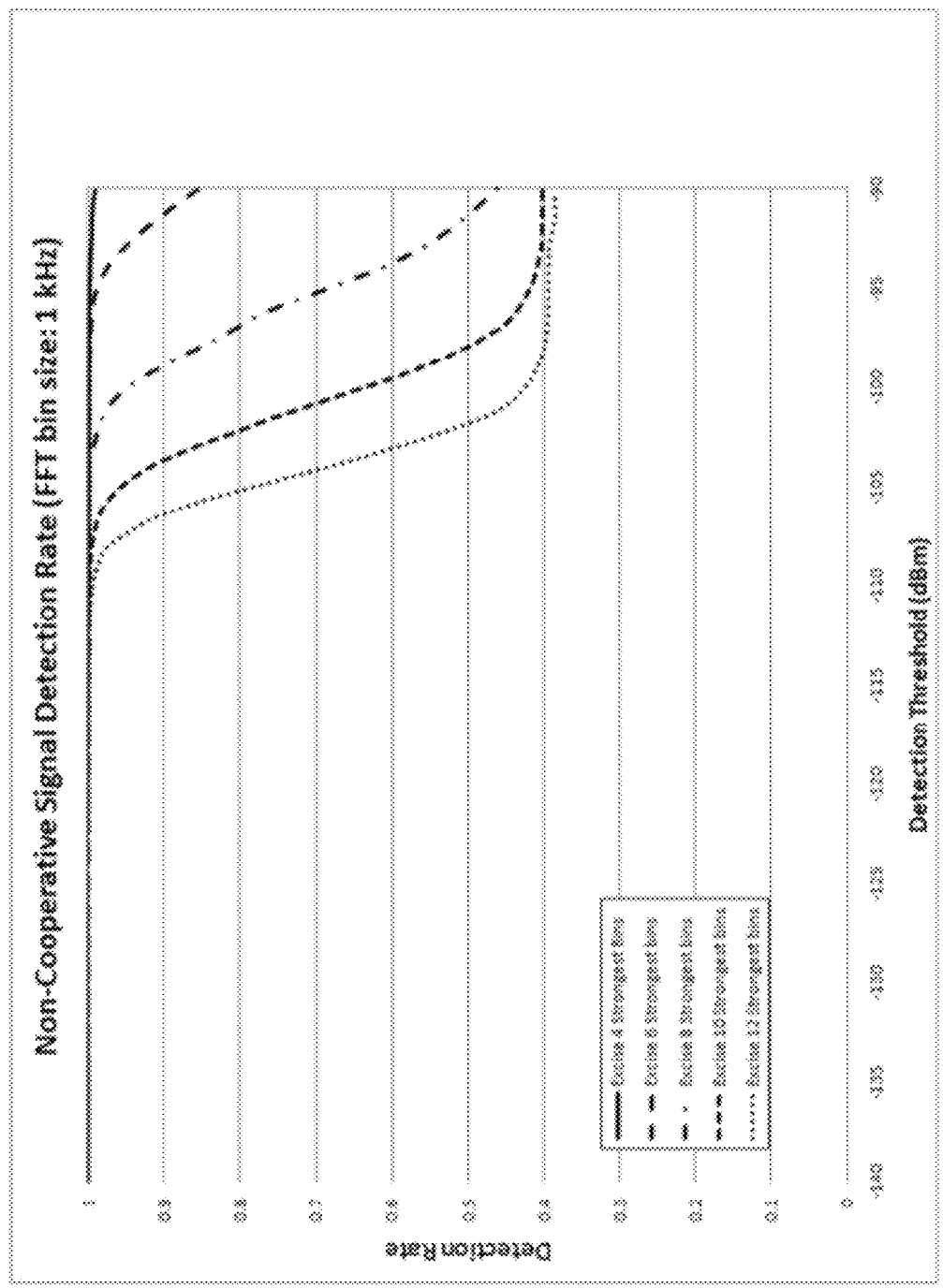
FIG. 17 is a graph depicting the non-cooperative signal detection probability for different detector FFT bin excision configurations.

FIG. 17 is a graph showing the Percentage Detection Rate vs. Detection Threshold in dBm when excising the top (N) 1-kHz FFT bins in a 25 kHz channel, for N=4, 6, 8, 10, 12 based on example measured data of signals. Without excising any frequency bins, a high false alarm rate (>0.05) occurs with a detection threshold of −94 dBm or less as shown in FIG. 16. If eight (8) frequency bins are excised, then a high false alarm rate (>0.05) occurs with a detection threshold of −116 dBm or less as shown in FIG. 16. FIG. 17 shows that when eight (8) frequency bins are excised, the detection probability is still very high (>99%) at a threshold of −100 dBm. Thus, the spur rejection detector provides 22 dB of detection threshold improvement.

The specific values in the example are representative, and different values may be used to obtain different false alarm and detection probability operating points and the values may change depending on the noise characteristics.

1.7.5 Impulse Rejection Example

Broad bandwidth impulse noise is frequently created by power line arcing. This noise occurs with a 120 Hz repetition rate that is synchronized with power lines and occurs due to a high voltage spark that lasts approximately 10 nsec. At each impulse noise event, there are multiple (3-8) irregularly spaced, noise bursts. Thus, the impulse noise burst occurs at 0.4 to 1 bursts per millisecond rate on average.

A typical DSA-enabled device may sample spectrum for a period of 0.040 millisecond to 100 milliseconds, depending on the signal type expected and the detector type used. A shorter sampling period typically may require only a few (2 or 3) FFT views to insure that at least one FFT view doesn't have an impulse noise burst.

1.7.6 Bins Excised vs. Signal to Noise Ratio (SNR) Improvement

There can be a tradeoff between the number of FFT bins excised and the overall Signal to Noise Ratio (SNR) improvement. Man-made noise is characterized by very narrow bandwidth spikes or very short duration wide bandwidth impulses in the spectrum of a signal, while the desirable signals are characterized by broader bandwidth (when compared to spike noise) and long duration (compared to impulse noise). By excising bins with high frequency domain median power values, noise is affected to a greater extent than the signal is. However, if too many bins are excised, signal begins to be affected adversely as well. If too few bins are excised, noise that interferes with the signal may remain. Determination of the optimal value for (N), the number of bins to excise, may significantly change the outcome in noise reduction as measures by SNR.

Figure 18:
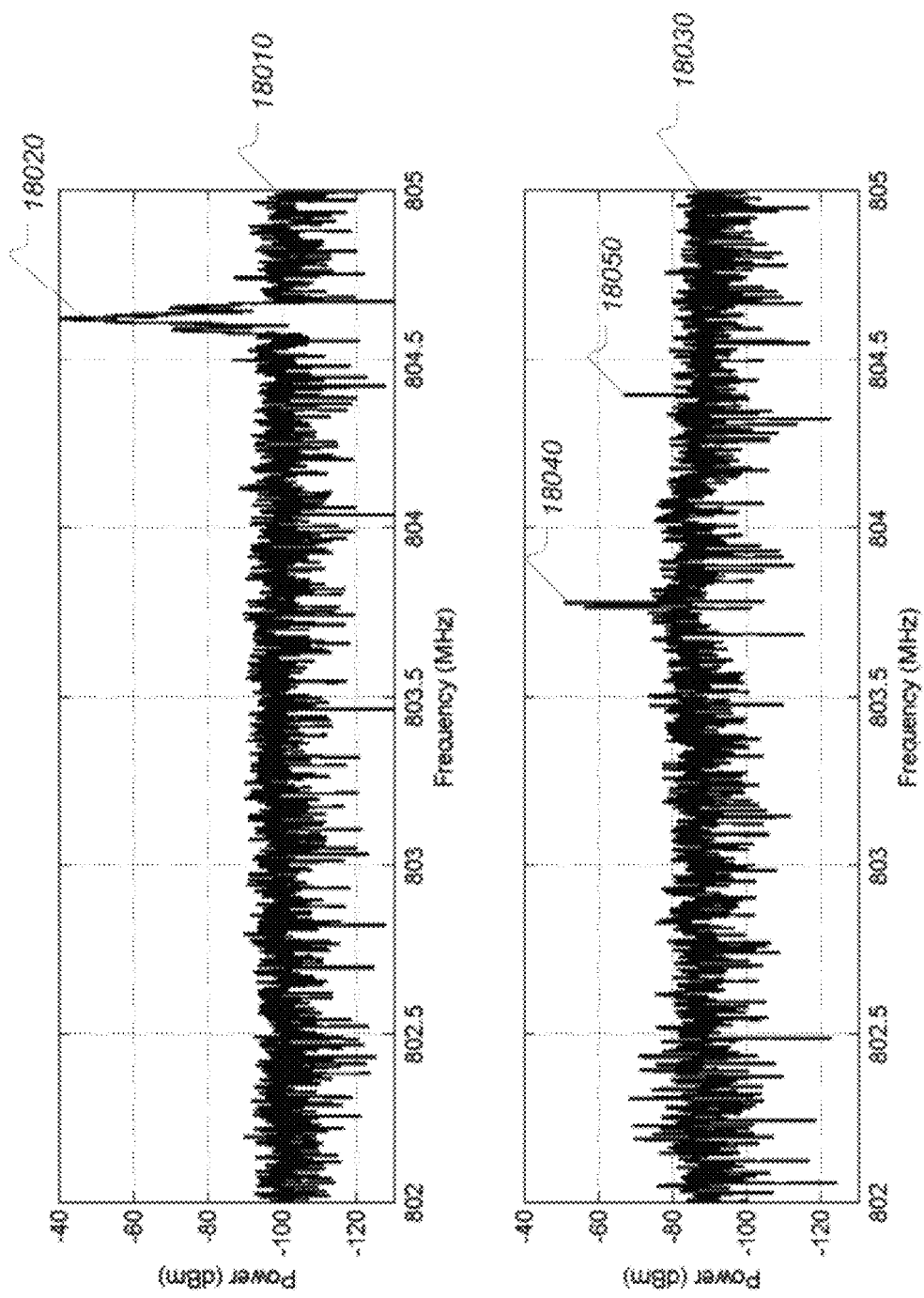
FIG. 18 is a pair of graphs showing example spectrum segments with a signal and with man-made broad bandwidth noise.

FIG. 18 shows a spectrum segment 18010 containing a Non-Cooperative (NC) device signal 18020, and another spectrum segment 18030 containing man-made noise 18040 and 18050. No bins have been excised from either sample.

Figure 19:
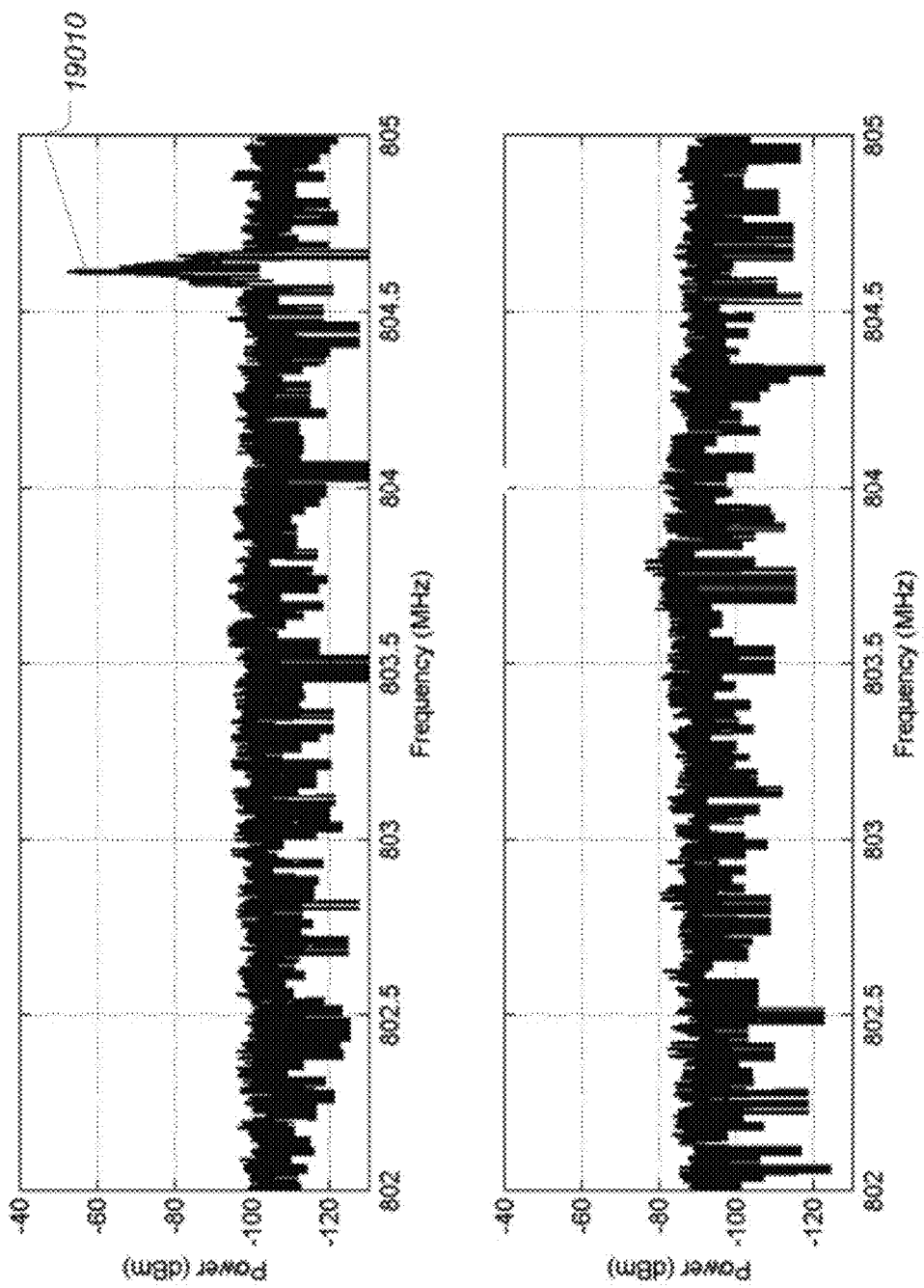
FIG. 19 is a pair of graphs showing the example spectrum segments from FIG. 18 with 8 FFT bins excised.

FIG. 19 shows the same spectrum segments as FIG. 18, but with the 8 bins having the highest power in each 25 kHz channel excised from the channel. The overall noise level has been reduced, and in particular, the man-made noise spikes 18040 and 18050 have been eliminated, without eliminating the signal 19010.

Figure 20:
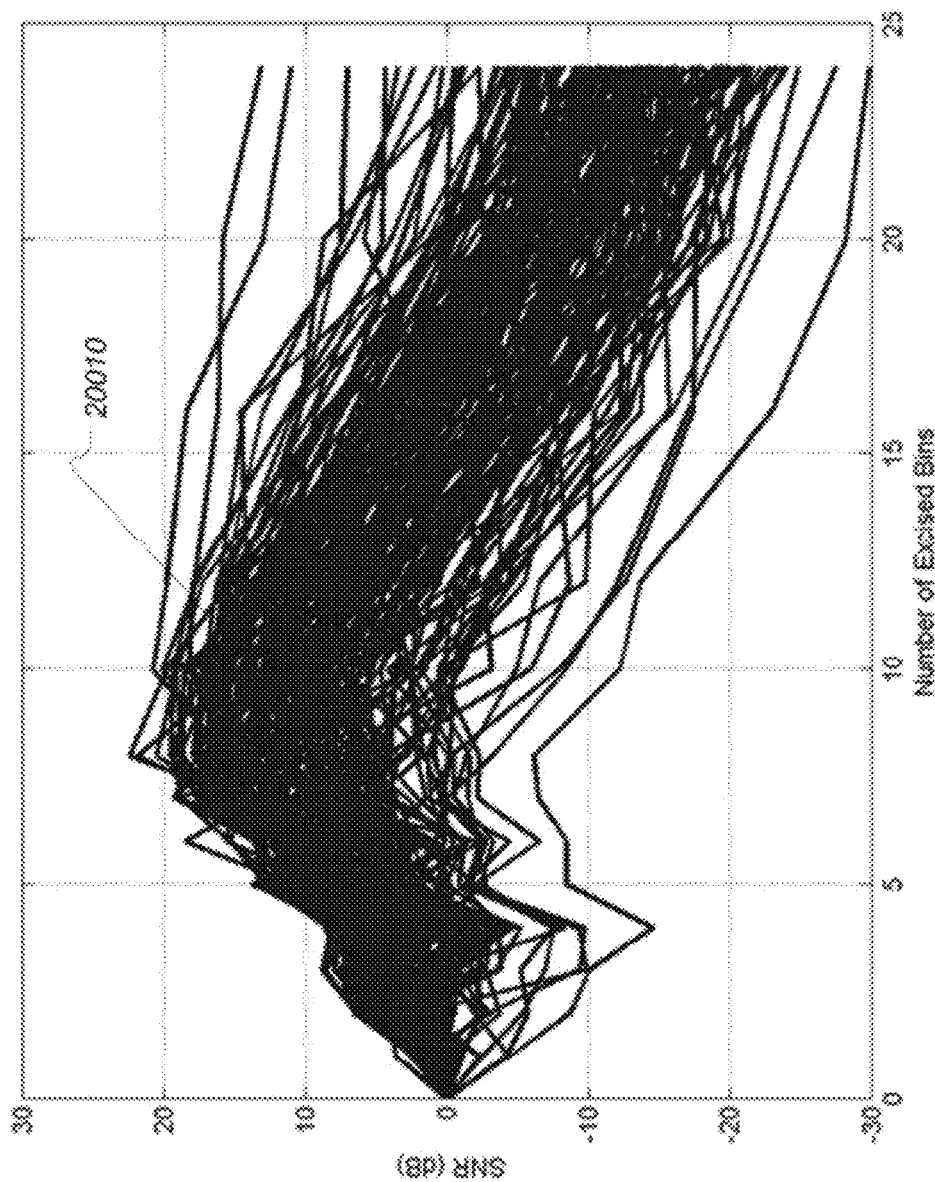
FIG. 20 is a graph of signal to noise ratio vs. number of bins excised for the signals of FIG. 18.

FIG. 20 shows a graph of the change in the SNR value versus the number of bins excised. The SNR is defined to be the change in the amplitude of the signal minus the amplitude of the man-made and thermal noise. The dataset used for the graph contained 160 FFT views; hence, there are 160 curves in the graph. There is a maximum in the SNR at eight (8) bins excised (point 20010 of the graph). The selected value of eight bins is a function of the signal spectrum shape, the 1 msec long data sampling period (1 kHz bin bandwidth), and the level of the man-made noise in the operating environment. The particular value for the number of excised bins is illustrative and, as previously described, the particular number of bins excised in a specific signal scenario may be otherwise optimized or selected.

Figure 21:
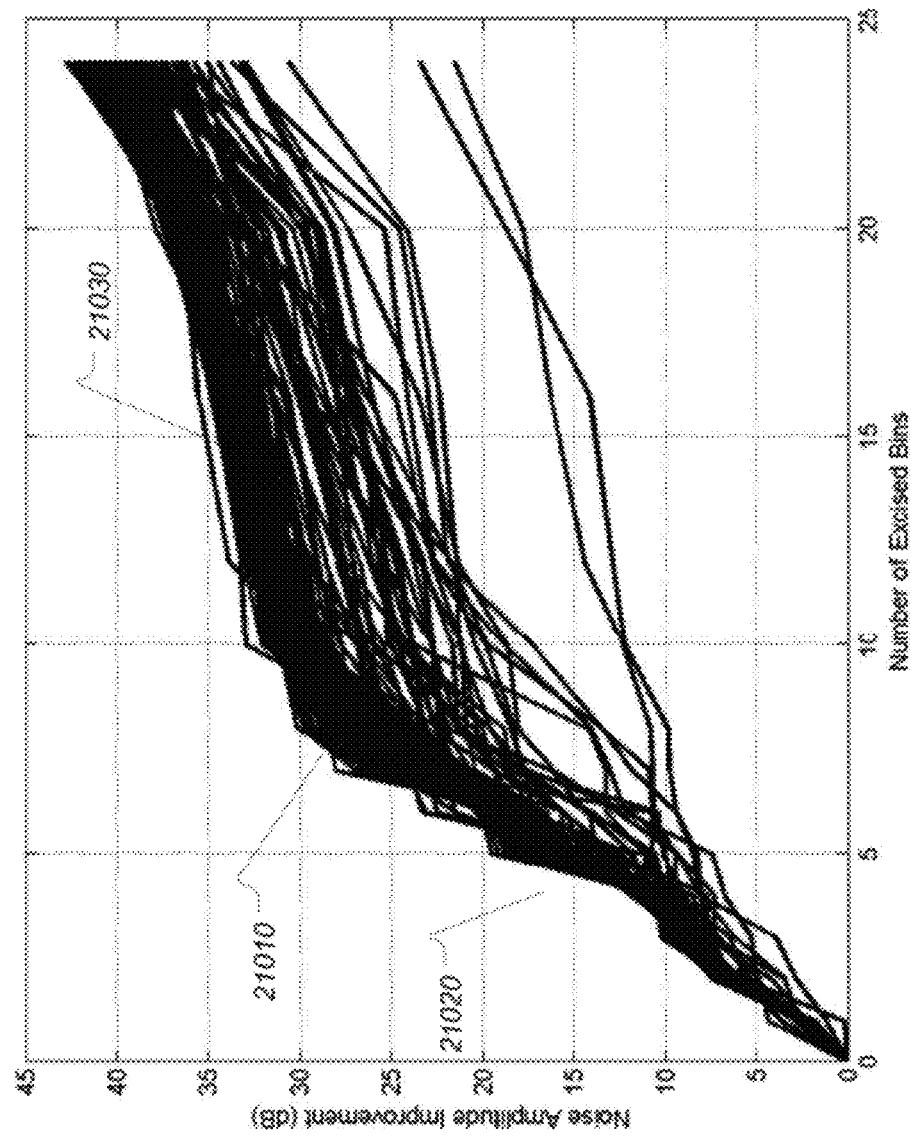
FIG. 21 is a graph of signal to noise ratio improvement vs. number of bins excised for the signal of FIG. 18.

FIG. 21 shows a graph of the improvement (reduction) in the noise level versus the number of bins excised. The dataset contained 160 FFT views; hence there are 160 curves in the figure. The data shows a "knee" in the curves at the eight (8) bins excised point 21010. The reduction in noise amplitude was rapidly increasing with each bin excised up to this point 21020, but became less rapid with each bin after this point 21030. Thus eight bins 21010 is the break point where the man-made and similar noise has been maximally removed and the dominant noise remaining is background thermal noise. Using bin excision to remove thermal noise is not beneficial since this noise is broadband and continuous, and does not match the characteristics of the noise types the method is designed to remove.

FIGS. 22*a*-26*b* provide experimental data illustrating the noise amplitude improvement of various channel sizes, bin bandwidth, and FFT view widths when processed by the combined noise excision techniques described in FIGS. 15*a* and 15*b*. It should be noted that each of these plots illustrate a common feature of using the noise excision techniques disclosed herein; there is a consistent and predicable improvement in signal caused by excising bins from the signal up to a specific "shoulder" in the graph, where the rate of improvement decreases. The improvement is present for spur, impulse, and mixed spur and impulse noise. This improvement is counterintuitive because conventionally it would be expected that discarding portions of the signal would not improve the signal characteristics.

Figure 22A:
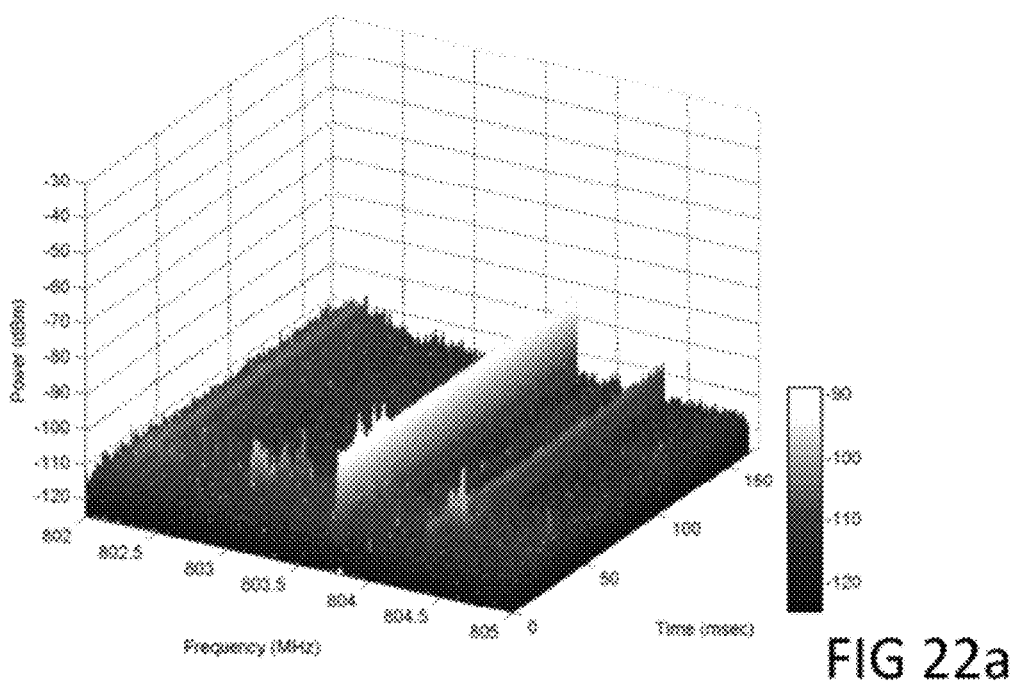
FIG. 22a is a graph of sampled energy illustrating spur noise and narrowband signal.
Figure 22B:
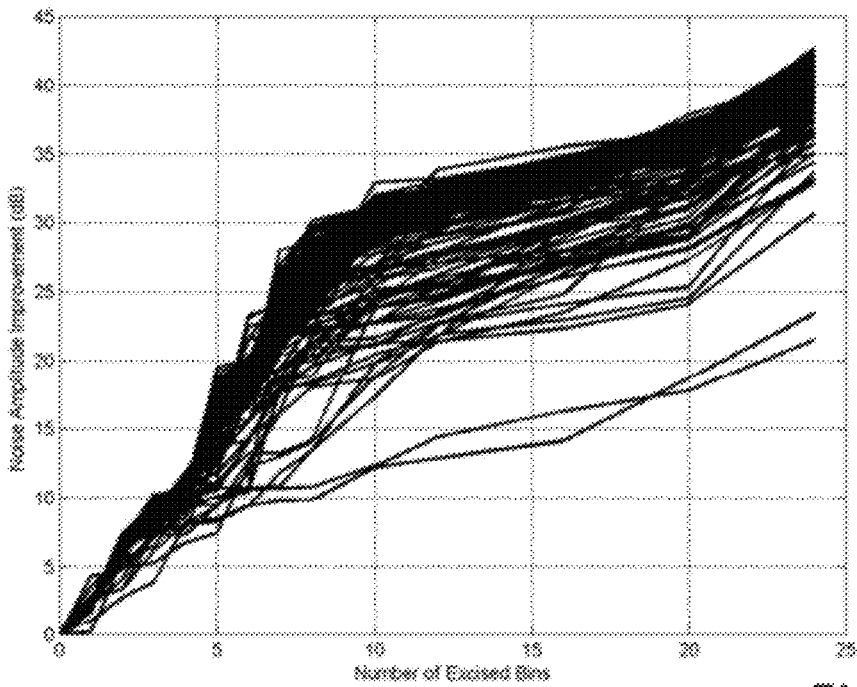
FIG. 22b is a graph of noise amplitude improvement in the data of FIG. 22a, using an FFT bin width of 25 kHz and varying numbers of excised FFT bins.

FIG. 22*a* shows a spectrum sample from a first location, showing narrow band spur noise. FIG. 22*b* shows an analysis of that data, using a channel bandwidth of 25 kHz, a bin bandwidth of 1 kHz, and an FFT view of 1 ms, to determine noise amplitude improvement vs. the number of bins excised. This results in 160 FFT views in the analysis, and hence 160 curves in the graph of FIG. 22*b*. Each block analyzed is 25 bins wide. The optimal bin count to excise is approximately nine; the point at which improvement in the noise amplitude per bin excised begins to decrease.

Figure 22C:
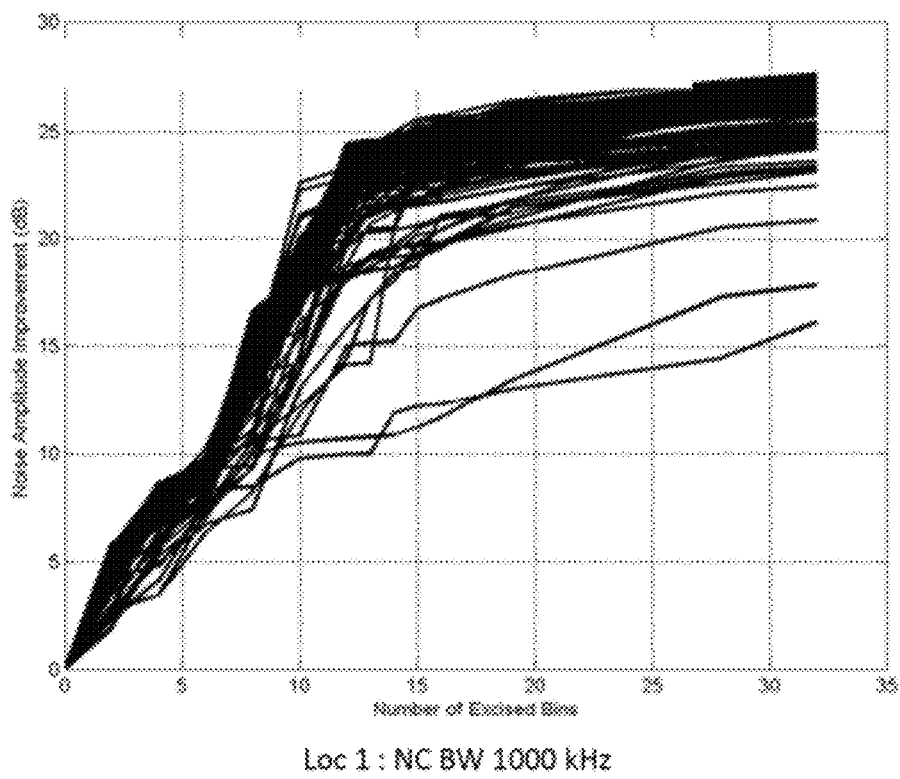
FIG. 22c is a graph of noise amplitude improvement in the data of FIG. 22a using an FFT bin width of 1000 kHz and varying numbers of excised FFT bins.

FIG. 22*c* shows an analysis of that data, using a channel bandwidth of 4000 kHz, a bin bandwidth of 1 kHz, and an FFT view of 1 ms, to determine noise amplitude improvement vs. the number of bins excised. This again results in 160 FFT views in the analysis, and 160 curves in the graph of FIG. 22*c*. Each block analyzed is 4000 bins wide. The optimal bin count to excise was found to be approximately thirteen, i.e., the point at which improvement in the noise amplitude per bin excised begins to decrease.

The increase in optimal bin count to excise in FIG. 22*c* over the optimal count from the analysis of FIG. 22*b* is due to the wider channel bandwidth, which causes an increase in the number of bins containing significant noise within the channels. This can also be seen in the "spread" of the curves, where FIG. 22*b* has a greater range of points at which the rate of increase in noise amplitude improvement with each additional bin's excision begins to decrease than does FIG. 22*c*. The narrower channel bandwidth combined with the noise clumps occurring at particular frequencies results in more diversity in FIG. 22*b* than in FIG. 22*c*. While the occurrence of a point indicating an optimal number of bins to excise exists in both cases, the specific point is different due to the effects of channel bandwidth.

Figure 23A:
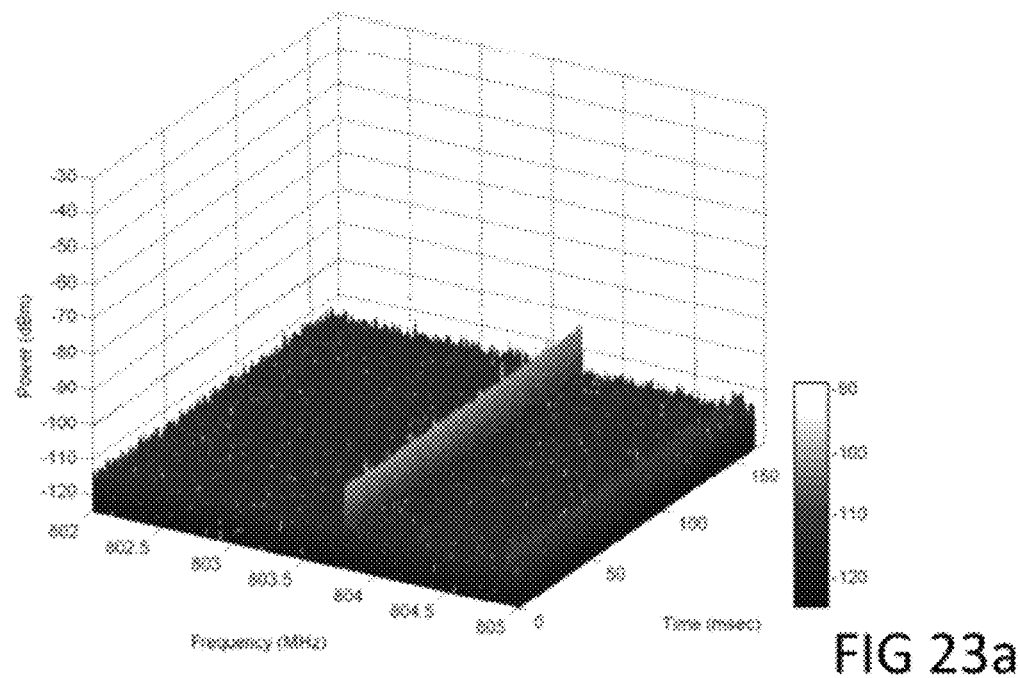
FIG. 23a is a graph of sampled energy illustrating repeating narrowband impulse noise sampled at a 100 kHz bandwidth.
Figure 23B:
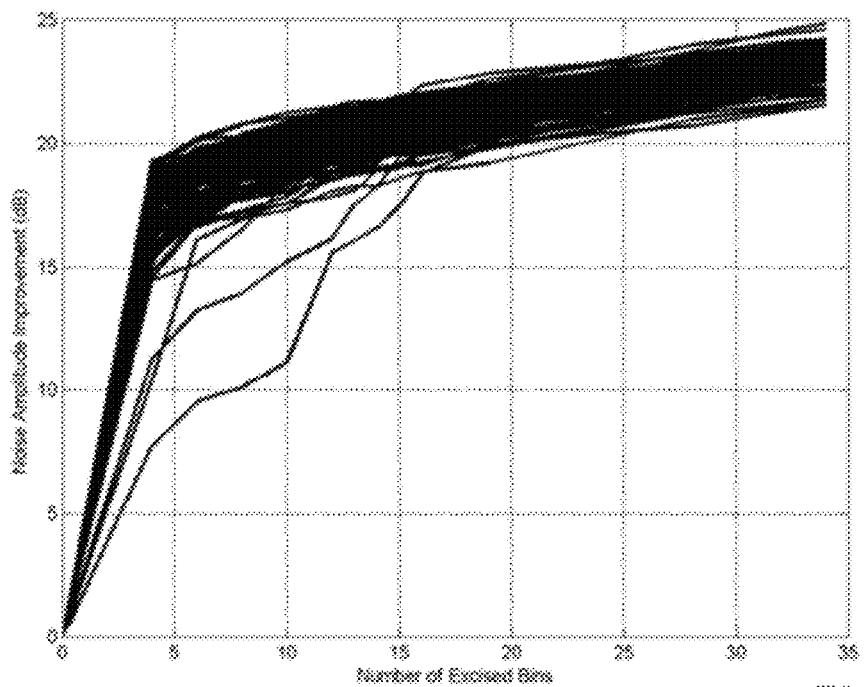
FIG. 23b is a graph of noise amplitude improvement in the data of FIG. 23a using an FFT bin width of 100 kHz and varying numbers of excised FFT bins.

FIG. 23*a* shows a spectrum sample from a second location where there was an occurrence of repeating spur noise (sometimes called repeating impulse noise). FIG. 23*b* shows an analysis of that data, using a channel bandwidth of 100 kHz, a bin bandwidth of 1 kHz, and an FFT view of 1 ms, to determine noise amplitude improvement vs. the number of bins excised. There are 100 bins in each block, and the optimal bin count to excise was found to be approximately five, by identifying the point at which improvement in the noise amplitude per bin excised begins to decrease. Repeating spur noise shows a steady improvement and a sharp shoulder in the performance.

Figure 24A:
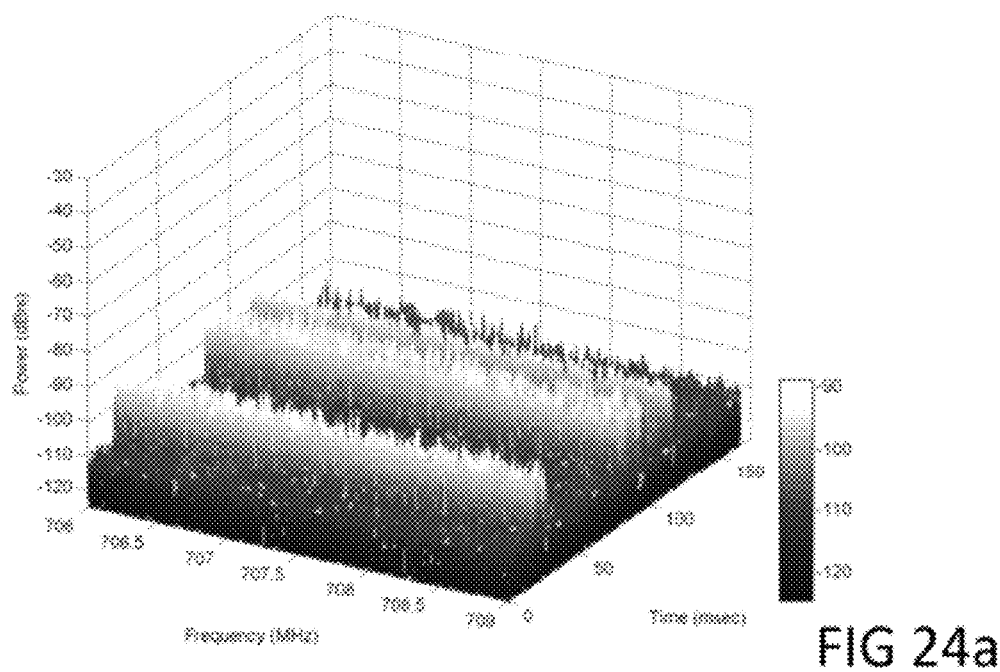
FIG. 24a is a graph of sampled energy illustrating repeating broadband impulse noise sampled at a 100 kHz bandwidth.
Figure 24B:
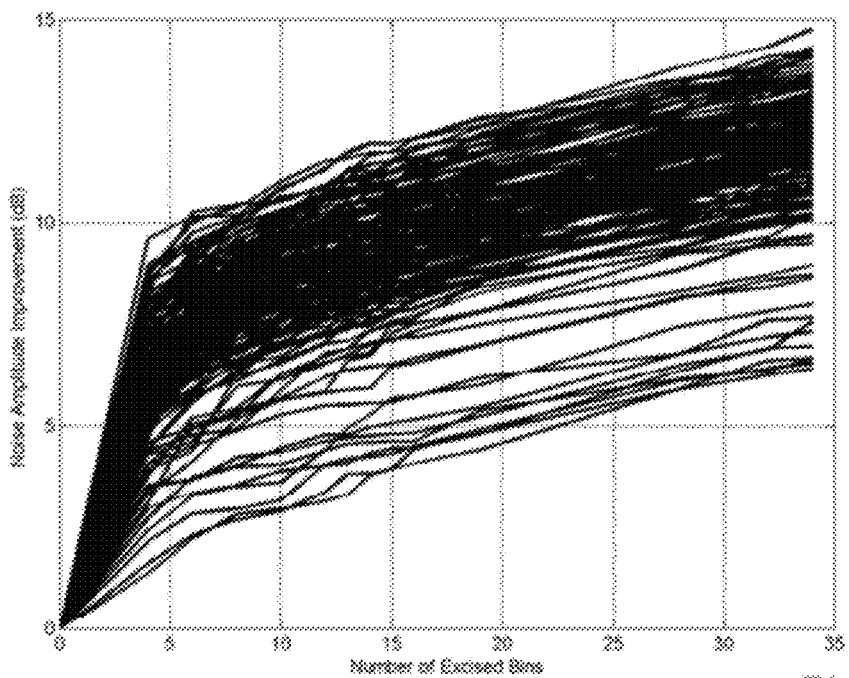
FIG. 24b is a graph of noise amplitude improvement in the data of FIG. 24a with varying numbers of excised FFT bins.

FIG. 24*a* shows a spectrum sample from a third location where a series of impulse noise events occurred. FIG. 24*b* shows an analysis of that data, using a channel bandwidth of 100 kHz, a bin bandwidth of 1 kHz, and an FFT view of 1 ms, to determine noise amplitude improvement vs. the number of bins excised. There are 100 bins in each block, and the optimal bin count to excise is approximately five.

FIG. 23a and FIG. 24a show distinctly different noise patterns, FIG. 23a having low strength spur noise, and FIG. 24a showing a repeated impulse noise. The channel bandwidth in both cases is the same, and the optimal bin count to excise is also the same, but the improvement in noise amplitude reduction is very different: approximately 18 dB in FIG. 23b and approximately 7 dB in FIG. 24b. The pattern of noise can have a large effect on the improvements possible from a given number of bins being excised, but in both cases there was significant improvement.

Figure 25A:
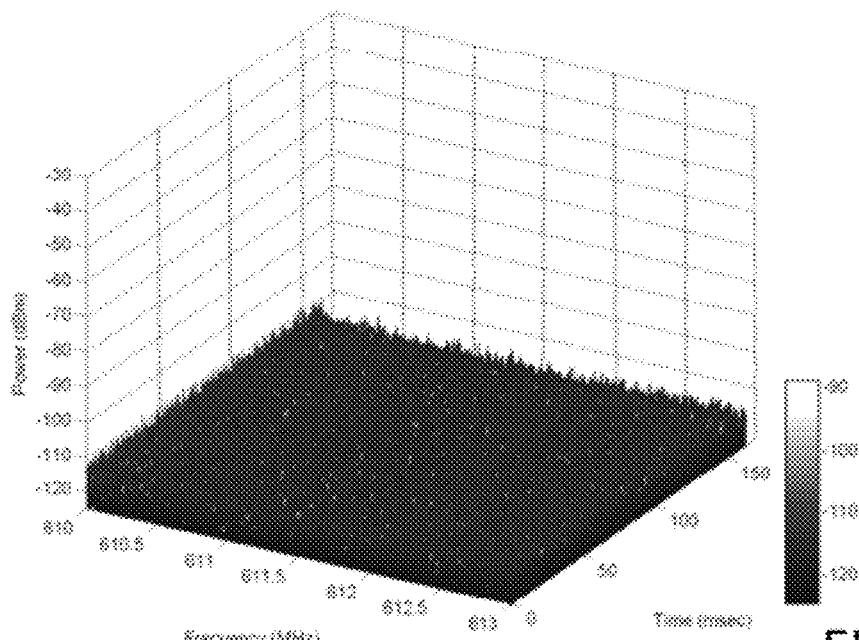
FIG. 25a is a graph of sampled energy illustrating background noise at a 100 kHz bandwidth.
Figure 25B:
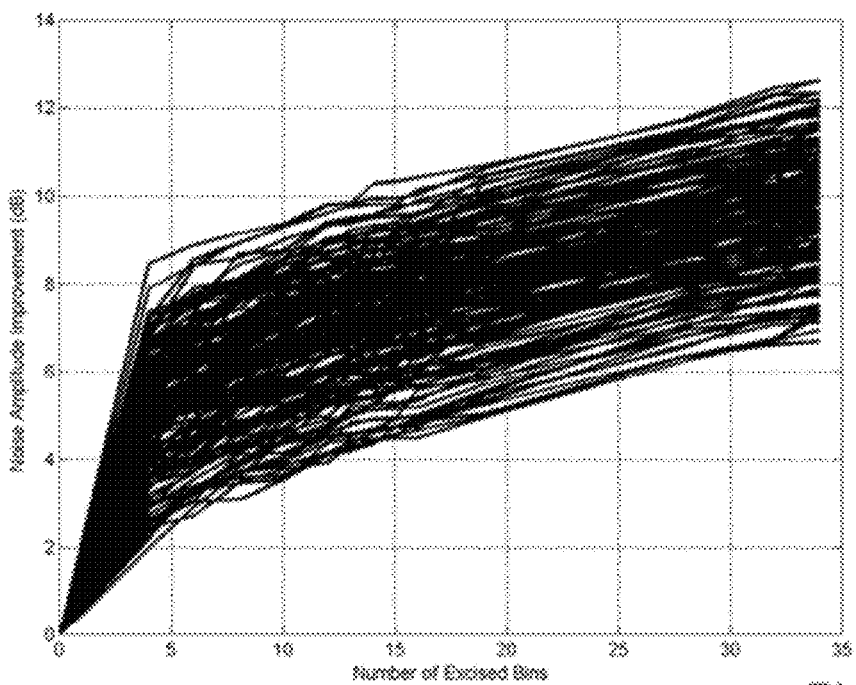
FIG. 25b is a graph of noise amplitude improvement in the data of FIG. 25a using an FFT bin width and varying numbers of excised FFT bins.

FIG. 25a shows a spectrum sample from a fourth location, where there is no signal and no noise other than background. FIG. 25b shows an analysis of that data, using a channel bandwidth of 100 kHz, a bin bandwidth of 1 kHz, and an FFT view of 1 ms, as in the previous two examples, to determine noise amplitude improvement vs. the number of bins excised. The optimal bin count to excise is again approximately five. FIG. 25a shows no noise other than background nor signal, and the excision of bins is primarily resulting in reduction of minor peaks in background noise. For this reason, the average noise amplitude improvement is limited to approximately 5 dB.

Note that the same "hockey stick" shape occurs in each of the analysis graphs, regardless of channel bandwidth, or noise type or pattern. The location of the "elbow" in the curve is the optimal number of bins to excise in order to gain maximum noise reduction through bin excision without adversely affecting signal detection.

Embodiments of the techniques disclosed herein may include or be embodied in the form of computer-implemented processes and apparatuses for practicing those processes. Embodiments also may be embodied in the form of a product having computer program code containing instructions embodied in non-transitory and/or tangible media, such as flash memory, optical media, hard drives, USB (universal serial bus) drives, or any other machine readable storage medium, such that, when the computer program code is executed by a computer, the computer becomes an apparatus for practicing embodiments of the disclosed processes. When implemented on a general-purpose microprocessor or computer, the instructions configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store the instructions adapted to be executed by the processor.

Unless explicitly indicated to the contrary herein, the disclosed techniques and steps may be performed within one or more components within a DSA-enabled device. For example, when a device detects spur and/or impulse noise, the disclosed techniques may be partially or entirely performed within the noise-excision detector. In some embodiments, portions of the disclosed techniques may be performed by other components of a DSA-enabled device. In some configurations, the techniques disclosed herein may be performed by components within multiple DSA-enabled devices, such as where sensing data is obtained by one device and transmitted to another device for processing.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. Dynamic Spectrum Access enabled (DSA-enabled) device comprising:
a detector configured to receive radio frequency energy within a channel encompassing a region of the radio spectrum; and
a processor configured to detect noise comprising spur noise, impulse noise, or a combination thereof in the radio frequency energy, and to generate a signal describing the radio frequency energy in the channel other than the detected noise;
said processor configured to generate the signal:
generating a plurality of FFT views of the detected energy;
for each FFT view, determining the frequency domain median power value over FFT view; and
discarding a selected number of FFT views having the highest frequency domain median power.

2. The device of claim 1, said device configured to communicate with at least one other DSA-enabled device on a channel on which the noise is detected.

3. The device of claim 1, said processor configured to generate the signal by:
obtaining instantaneous sample values of the radio frequency energy;
performing a Fast Fourier Transform (FFT) on the sampled energy values to generate a plurality of frequency bins;
identifying a selected number N of the frequency bins having the largest energy values within the channel width; and
replacing the amplitude values in the selected N frequency bins with a predetermined value.

4. The device of claim 1, said processor further configured to:
generate a plurality of FFT views of the detected energy;
for each FFT view, determine the frequency domain median power value over the plurality of FFT views; and
discard a selected number of FFT views having the highest frequency domain median power.

5. A method comprising:
receiving radio frequency energy within a channel encompassing a region of the radio spectrum;
detecting noise comprising spur noise, impulse noise, or a combination thereof in the radio frequency energy;
generating a plurality of FFT views of the radio frequency energy;
for each FFT view, determining the frequency domain median power value over the FFT view;
discarding a selected number of FFT views having the highest frequency domain median power; and generating a signal describing the radio energy in the channel other than the detected noise.

6. The method of claim 5, further comprising the step of communicating with at least one other Dynamic Spectrum Access enabled (DSA-enabled) device on a channel on which the noise is detected.

7. The method of claim 5, wherein said step of generating the signal further comprises:
   obtaining instantaneous sample values of the radio frequency energy;
   performing a Fast Fourier Transform (FFT) on the sampled energy values to generate a plurality of frequency bins;
   identifying a selected number N of the frequency bins having the largest energy values within the channel width; and
   replacing the amplitude values in the selected bins with a predetermined value.

8. A Dynamic Spectrum Access-enabled (DSA-enabled) device comprising:
   a detector configured to receive radio frequency energy within a channel encompassing a region of the radio spectrum; and
   a processor configured to detect noise comprising spur noise, impulse noise, or a combination thereof in the radio frequency energy, and to generate a signal describing the radio frequency energy in the channel other than the detected noise, said processor configured to generate the signal by:
      obtaining instantaneous sample values of the radio frequency energy;
      performing a Fast Fourier Transform (FFT) on the sampled energy values to generate a plurality of frequency bins;
      identifying a selected number N of the frequency bins having the largest energy values within the channel width; and
      replacing the amplitude values in the selected N frequency bins with a predetermined value.

9. The device of claim 8, said device configured to communicate with at least one other DSA-enabled device on a channel on which the noise is detected.

10. A method comprising:
    receiving radio frequency energy within a channel encompassing a region of the radio spectrum;
    detecting noise comprising spur noise, impulse noise, or a combination thereof in the radio frequency energy;
    obtaining instantaneous sample values of the radio frequency energy;
    performing a Fast Fourier Transform (FFT) on the sampled energy values to generate a plurality of frequency bins;
    identifying a selected number N of the frequency bins having the largest energy values within the channel width;
    replacing the amplitude values in the selected N frequency bins with a predetermined value; and
    generating signal describing the radio energy in the channel other than the detected noise.

11. The method of claim 10, further comprising the step of communicating with at least one other Dynamic Spectrum Access-enabled (DSA-enabled) device on a channel on which the noise is detected.

12. The method of claim 10, further comprising:
    generating a plurality of FFT views of the detected energy;
    for each FFT view, determining the frequency domain median power value over the plurality of FFT views; and
    discarding a selected number of FFT views having the highest frequency domain median power.

* * * * *